Sept. 3, 1963 W. C. ARNOLD ETAL 3,102,950

AUTOMATIC OPERATING MEANS FOR ACCOUNTING MACHINES

Filed Sept. 17, 1959 15 Sheets-Sheet 1

INVENTORS
WILLIAM C. ARNOLD &
CHESTER N. JORGENSEN

BY Louis A Kline
Albert L. Sessler, Jr.

THEIR ATTORNEYS

AUTOMATIC OPERATING MEANS FOR ACCOUNTING MACHINES

Filed Sept. 17, 1959 15 Sheets-Sheet 2

INVENTORS
WILLIAM C. ARNOLD &
CHESTER N. JORGENSEN
BY Louis A Kline
Albert L. Sessler, Jr.
THEIR ATTORNEYS

AUTOMATIC OPERATING MEANS FOR ACCOUNTING MACHINES

Filed Sept. 17, 1959 15 Sheets-Sheet 3

INVENTORS
WILLIAM C. ARNOLD &
CHESTER N. JORGENSEN

BY Louis A Kline
Albert L. Sessler Jr.

THEIR ATTORNEYS

AUTOMATIC OPERATING MEANS FOR ACCOUNTING MACHINES

Filed Sept. 17, 1959 15 Sheets-Sheet 4

INVENTORS
WILLIAM C. ARNOLD &
CHESTER N. JORGENSEN
BY Louis A. Kline
Albert L. Sessler, Jr.
THEIR ATTORNEYS

INVENTORS
WILLIAM C. ARNOLD &
CHESTER N. JORGENSEN

BY Louis A. Kline
Albert L. Sessler, Jr.

THEIR ATTORNEYS

AUTOMATIC OPERATING MEANS FOR ACCOUNTING MACHINES

Filed Sept. 17, 1959 15 Sheets-Sheet 6

INVENTORS
WILLIAM C. ARNOLD &
CHESTER N. JORGENSEN

BY Louis A. Kline
Albert L. Sessler, Jr.

THEIR ATTORNEYS

INVENTORS
WILLIAM C. ARNOLD &
CHESTER N. JORGENSEN
BY Louis A. Kline
Albert L. Sessler, Jr.
THEIR ATTORNEYS

AUTOMATIC OPERATING MEANS FOR ACCOUNTING MACHINES

INVENTORS
WILLIAM C. ARNOLD &
CHESTER N. JORGENSEN

BY Louis A. Kline
Albert L. Sessler, Jr.

THEIR ATTORNEYS

AUTOMATIC OPERATING MEANS FOR ACCOUNTING MACHINES

INVENTORS
WILLIAM C. ARNOLD &
CHESTER N. JORGENSEN
BY Louis A. Kline
Albert L. Sessler, Jr.
THEIR ATTORNEYS

AUTOMATIC OPERATING MEANS FOR ACCOUNTING MACHINES

Filed Sept. 17, 1959 15 Sheets-Sheet 10

INVENTORS
WILLIAM C. ARNOLD &
CHESTER N. JORGENSEN
BY Louis A Kline
Albert L. Sessler Jr.
THEIR ATTORNEYS AUTOMATIC OPERATING MEANS FOR ACCOUNTING MACHINES
Filed Sept. 17, 1959 15 Sheets-Sheet 11
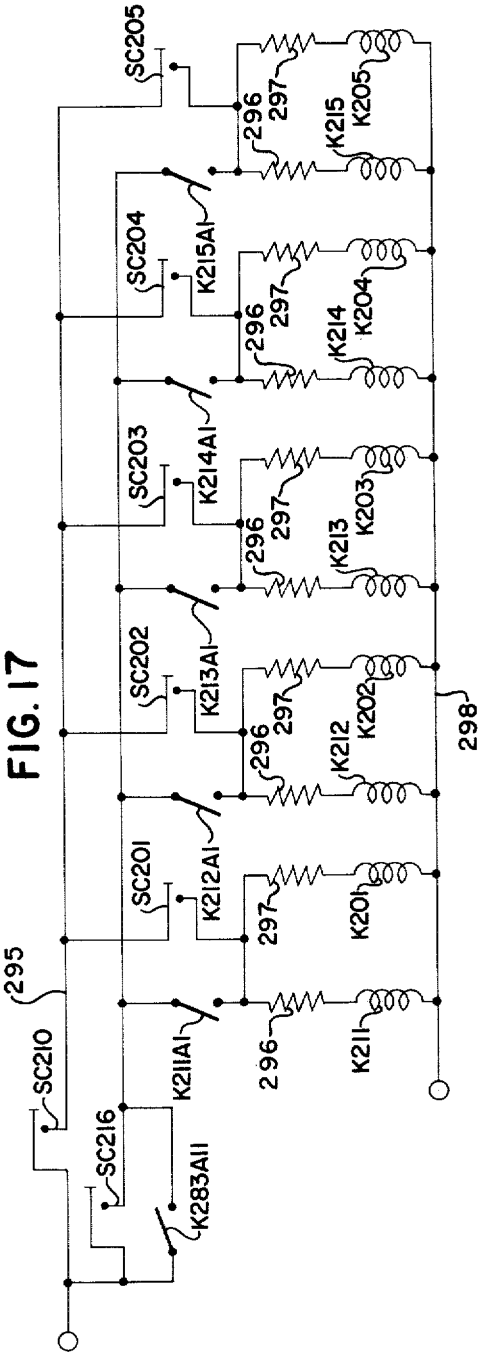
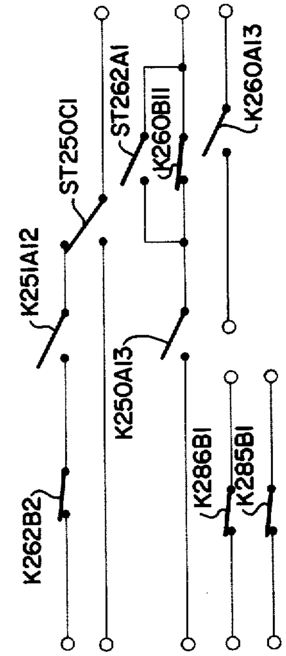
FIG. 19
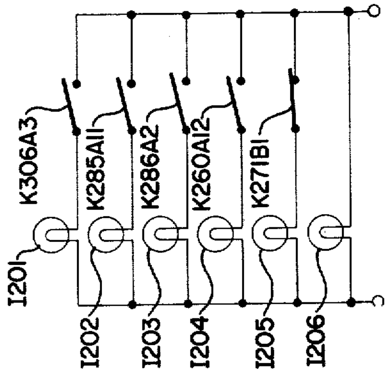
FIG. 18
INVENTORS
WILLIAM C. ARNOLD &
CHESTER N. JORGENSEN
BY Louis A. Kline
Albert L. Sessler, Jr.
THEIR ATTORNEYS INVENTORS
WILLIAM C. ARNOLD &
CHESTER N. JORGENSEN
BY Louis A. Kline
Albert L. Sessler, Jr.
THEIR ATTORNEYS

AUTOMATIC OPERATING MEANS FOR ACCOUNTING MACHINES

Filed Sept. 17, 1959 15 Sheets-Sheet 13

INVENTORS
WILLIAM C. ARNOLD &
CHESTER N. JORGENSEN

BY Louis A. Kline
Albert L. Sessler, Jr.

THEIR ATTORNEYS

INVENTORS
WILLIAM C. ARNOLD &
CHESTER N. JORGENSEN
BY Louis A. Kline
Albert L. Sessler, Jr.
THEIR ATTORNEYS Sept. 3, 1963 W. C. ARNOLD ETAL 3,102,950

AUTOMATIC OPERATING MEANS FOR ACCOUNTING MACHINES

Filed Sept. 17, 1959 15 Sheets-Sheet 15

INVENTORS
WILLIAM C. ARNOLD &
CHESTER N. JORGENSEN

BY Louis A. Kline
Albert L. Sessler Jr.

THEIR ATTORNEYS

United States Patent Office 3,102,950

Patented Sept. 3, 1963

3,102,950
AUTOMATIC OPERATING MEANS FOR ACCOUNTING MACHINES

William C. Arnold and Chester N. Jorgensen, Dayton, Ohio, assignors to The National Cash Register Company, Dayton, Ohio, a corporation of Maryland Filed Sept. 17, 1959, Ser. No. 840,701
22 Claims. (Cl. 235—61.7)

This invention relates to automatic operating means for accounting machines, and more particularly relates to means for effecting automatic data input and operation control of an accounting machine, so that a plurality of accounts or transactions can be automatically processed by an accounting machine without the need of any human intervention or assistance.

The increasing amount of paper work required to be handled in almost all types of commercial establishments has created considerable demand for accounting machines or devices which are capable of rapid, accurate account keeping and which require the attendance of a minimum number of human operators. This is particularly true in the banking field, where a very large volume of checks and deposits must be handled during each accounting period for many of the checking accounts maintained in the bank. A recent development in accounting machines particularly suited for bank applications is a machine which is capable of utilizing ledger cards having magnetically-coded information thereon, and which can pick up the magnetically-coded information from the ledger card when the ledger card is inserted into the machine, without the necessity for manual entry of this data by a machine operator. This machine represents a considerable advance in bank accounting procedures and enables a very considerable saving in time and numbers of operators to be realized. Another recent development is that of a feeding device which is adapted for use with an accounting machine of the above-mentioned type, and which is capable of automatically feeding the ledger cards into the accounting machine without the necessity for any human assistance.

It is the purpose of the present invention to provide means capable of sensing data from a record medium such as perforated paper tape, and controlling an accounting machine and a feeding device, which may be of the above-mentioned types, to cause the input of such sensed data into the accounting machine according to a predetermined arrangement. Such data may include amount information to be added to or subtracted from the balance of a particular account, such as checks and deposits; identification information such as an account number to insure that the amount information is entered on the correct account; and control information pertaining to the type of transaction, such as check or deposit, and also including a signal for initiation of operation of the accounting machine. Solenoid-operated means are provided in association with the keyboard of the accounting machine for operation of the various keys, and are energized according to the signals sensed from the tape to effect entry of the information into the accounting machine. In addition, various interlocks and control circuits interconnect the accounting machine, the sensing device, and the feeding device to insure operation of these mechanisms in the proper sequence, and to prevent the entry of erroneous information.

It is contemplated that in normal usage of the sensing device, it will be used in association with both the accounting machine and the feeding device, so that a completely automatic accounting operation is possible. However, in some instances, it may be desired to operate the accounting machine by means of the sensing device without use of the feeding device, and this too is possible.

Accordingly, it is an object of the present invention to provide means for controlling an accounting machine in accordance with information sensed from record media.

Another object is to provide a mechanism capable of automatically processing a plurality of accounts, including the entering of the individual items on such accounts, and the production of new balances for these accounts, without the necessity for a human operator.

An additional object is to provide means, in a machine accounting system, for relating data taken from one type of record medium to data taken from another type of record medium, and for rejecting the data taken from one of said record media if the related data do not correspond.

A further object is to provide means, in a machine accounting system, for relating data taken from two different types of record media, rejecting one of said types of record media and its data if the related data do not correspond, counting the number of successive rejections, and preventing operation of the system after a predetermined number of rejections.

A further object is to provide means for entering data into an accounting machine from a plurality of different types of record media, producing a balance from said data, and effecting a desired one of a plurality of different predetermined results which may be selected to take place in the event of an overdraft balance.

Another object is to provide a mechanism capable of automatically processing a plurality of accounts, including the entry and recording on record cards of individual items on such accounts, and the producing and recording on record cards of new balances for these accounts, with automatic means to prevent further operation of the mechanism in the event that the recording capacity of a record card is reached.

An additional object is to provide means, in a machine accounting system, for sensing data from record media, and for disabling the sensing means in the event that the sensed data do not conform to a predetermined code.

Still a further object is to provide means, in a machine accounting system, for relating comparison data taken from one type of record medium to comparison data taken from another type of record medium, for rejecting the data taken from one of said types of record media if the related data do not correspond, and for manually introducing comparison data into the system when appropriate.

Another object is to provide means, in a machine accounting system, for sensing and entering data from two different types of media, the means for sensing data from one of the types of media being disabled in the event of an incorrect sensing of data from the other of the types of media.

With these and other objects, which will become apparent from the following description, in view, the invention includes certain novel features of construction and combinations of parts, a preferred form or embodiment of which is hereinafter described with reference to the drawings which accompany and form a part of this specification.

FIGS. 12 to 21, inclusive, 22A, 22B, and 22C show the electrical circuitry employed in the present invention.

GENERAL DESCRIPTION

Figure 1:
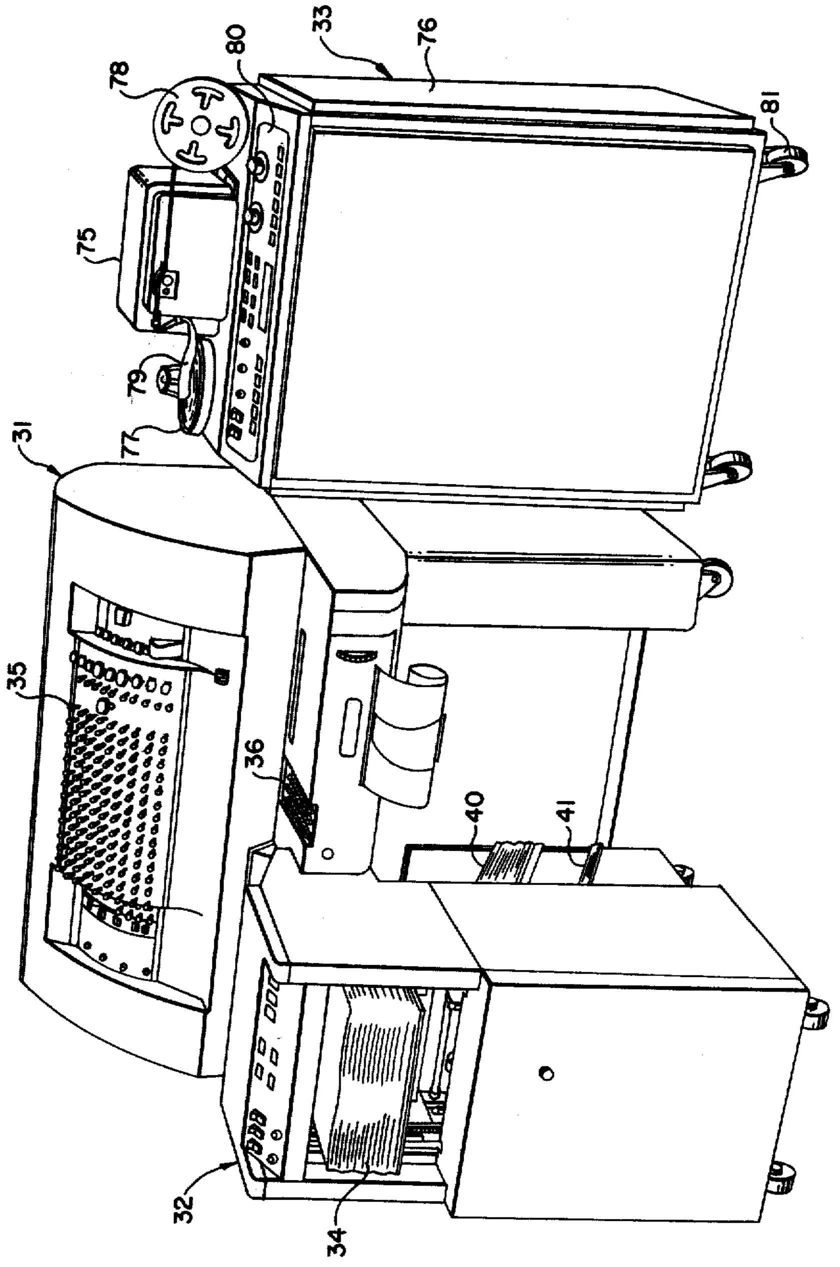
FIG. 1 is a perspective view of the components making up the system of the present invention, including the accounting machine, the ledger card feeding device, and the tape-reading mechanism, shown in operative relation.

In FIG. 1, an accounting machine 31 is shown in operative relation to a ledger card feeder 32 and a tape-reading unit 33. In order to explain clearly the construction and operation of the device of the present invention, it is considered desirable first to describe briefly the functioning of the accounting machine 31 with which the card-feeding device 32 and the tape-reading device 33 are associated in the present embodiment.

The accounting machine 31 is controlled in part by ledger cards 34, shown in stacked formation in the feeding device 32. On the ledger cards 34 is printed the usual information pertaining to the account, such as the check and deposit entries, the balances after each transatcion entry, the check count, the sign of the balance, the date, etc. In addition, the card has recorded thereon magnetically the last balance and related data, such as the account number, the sign of the balance, the check count, and the number of the line on which the next entry is to be printed on the ledger card. Magnetic reading and recording means in the accounting machine read the information magnetically encoded on the card and enter this information into the machine. Upon completion of posting of an account, the old magnetically-encoded information is erased and replaced with new information.

Figure 11:
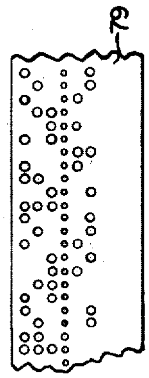
FIG. 11 is a fragmentary view of a section of the perforated tape used in the present invention.

The accounting machine 31 is also controlled by information read from a paper tape 79 (FIGS. 1 and 11) by the tape reader 33 and transmitted to the accounting machine by means of electrical signals, which are utilized to operate solenoids which control the keys of the keyboard 35 of the accounting machine. The tape 79, a fragment of which is shown in detail in FIG. 11, is made from any suitable paper-like material, and contains eight possible channels of information as well as a track of sprocket holes, which are used in the feeding of the tape. Information is encoded in the tape by perforation thereof in the various channels, according to the code employed, and is in the form of discrete "frames," each of which includes a three-digit account number, a plurality of characters corresponding to the various banks of the accounting machine keyboard, and a trip symbol, shown in FIG. 11 as constituting perforations in channels 1, 2, and 3. The two characters representing the transaction rows of the accounting machine will always be present in a frame, while the number of characters representing amount and check count information will vary according to the information in the frame. It will be noted that reading of a frame always commences with an account number and concludes with a trip symbol, and is in a direction from right to left, as shown in FIG. 11. The manner in which the information is read from the tape by the reading device 33, transmitted to the accounting machine, and caused to operate the accounting machine for the entry of information therein, will be described in detail subsequently.

Information may also be entered into the accounting machine manually, by means of the protruding key tips of the keyboard 35. The information entered either through the tape reader 33 or by means of manual entry on the keyboard 35 is combined with the data read by the accounting machine from the ledger card 34 to form new balances. In a new balance recording operation, the data pertaining to the new balance is printed on the ledger card 34; the previous magnetically stored data is erased; and the new balance, and related data pertaining to the new balance, are magnetically stored on the card in its place.

The accounting machine is provided with a number of safeguards to insure correctness of the pickup operation. One of these safeguards is a check to be sure that all of the data has been read from the card. Failure to read any data will prevent the entry of the remaining data into the machine, and will cause the feeding device 32 to cease operation.

Another of these safeguards is a check to be sure that the data which was read has been correctly entered into the machine by comparing the data actually set in the machine with the data actually recorded on the card. This is accomplished by first reading the ledger card and controlling the setting of the machine according to the data which was read, and then reading the card a second time and comparing the second reading with the actual setting of the machine. If there is no argeement, the further normal operation of the machine is prevented, and only a corrective operation of the machine may take place.

A further safeguard cooperates with the above two to insure that overprinting on the ledger card will be avoided. This involves the automatic recording of the line number on the card corresponding to the line on which the next printing is to be made. Accordingly, if the number is read correctly and is correctly set in the machine, as indicated by the two safeguards previously mentioned, then the card will be positioned in the next operation with the proper line thereon in printing position.

The accounting machine is provided with a further safeguard to insure the correctness of entries. This involves a comparison of account numbers, one account number being provided on each ledger card and relating to the account for that particular card, and another account number being provided for each frame of information contained on the paper tape which is read by the tape reading unit 33. Comparison of these numbers, in a manner to be subsequently described, insures that information relating to checks and deposits will be posted upon the correct account. Also, an account number keyboard 36 is provided, on which the account number may be set when it is desired to enter such a number manually. Failure of the account numbers to agree in any instance will cause the card 34 to be fed from the machine immediately and will prevent data from being entered into the machine from the tape read by the tape reading unit 33 at that time.

These automatic safeguards and checking means, together with the usual interlocks and controls, insure virtually "error-proof" operations without the necessity for running proofs on work already performed.

The accounting machine is provided with a data storage means, in which the balance and the check count are stored when they are read and are retained until it is determined that something has been read from each channel on the card and that there has been an agreement between the account number read from the card and that entered into the machine from the punched paper tape through the unit 33, or by means of the account number keyboard 36. If data was read from each channel on the card, and if the account numbers agree, then the balance and the check count are entered into the totalizer and the counter of the machine under control of the data storage means. If there is a failure to read data from any channel on the card, the feeding device 32 is caused to cease operation. If the account numbers do not agree, the card is immediately fed from the machine, as indicated above, and the balance and the check count are not entered into the totalizer and the counter of the machine. By thus storing the balance and the check count until it is determined that data has been read from all of the channels on the card and until it is determined that there is agreement between the account numbers, incorrect entries and corrective operations of the machine are minimized.

The accounting machine is also provided with extremely flexible controls which enable it to perform different types of operations involving reading and recording operations on the cards. For example, with one setting of the controls, the card-reading operation may be eliminated, and data may be set up on the keys of the machine and recorded magnetically on the card. With another setting of the controls, a normal posting operation may take place involving the reading of the card to pick up the old balance, the entering of checks and/or deposits by operating the machine under control of the tape-reading unit 33 or the keys of the keyboard 35, and the recording of the new balance on the card. With a further setting of the controls, the machine may be controlled to transfer certain stored data from one card to another, as at the end of the month or accounting period or when a ledger card has been filled, and in this operation data is read from a card and set up in the machine, the old card is removed from the machine and a new card put in the machine, and certain of the data which was read is recorded on the new card. With still a further setting, the controls are effective to cause the machine to operate in a trial balance operation, in which the stored data is read, the old balance and the check count are entered into the machine, and the card is ejected without erasure of the stored data or the recording of any further data thereon. For a further, more detailed description of the construction and operation of an accounting machine similar to the accounting machine 31, but designed for manual entry of check and/or deposit information, reference may be had to the United States patent application Serial No. 610,754, filed September 19, 1956, by Konrad Rauch et al., inventors, now Patent No. 2,947,475, issued August 2, 1960.

The feeding device 32 is capable of being moved into and out of an operative relation with the accounting machine 31, to enable the machine 31 to be used by itself for manual operation. Associated with the feeding device 32 are two bins 40 and 41, into which ledger cards 34 may be automatically placed after being ejected from the accounting machine 31 upon completion of an accounting transaction. Either one of the bins 40 and 41 may be selected to receive a ledger card ejected from the accounting machine 31 under control of a signal from said machine. For example, cards bearing positive balances may be sorted into one bin, while cards having overdraft balances are sorted into the other. For a more detailed description of the feeding device 32, reference may be had to the United States patent application, Serial No. 770,673, filed October 30, 1958, by Henrv Grosnickle, Jr., et al., inventors.

*System Operation*

To facilitate understanding of the system of the present invention, a general description of typical operations of the automated accounting system will be given.

The system will first be described as it functions in a typical series of posting operations. In such a series of operations, the account ledger cards pertaining to the various accounts are grouped in stacks of 1,000 in numerical order. At the top of each stack of cards is a special control card.

A selected stack of cards is first inserted into the feeder 32. A length of punched paper tape 79 bearing data relating to the accounts represented by the stack of ledger cards is then positioned in the tape-reading device for sensing by the tape reader 75.

To initiate operation of the automated system, the operator indexes an account number manually on the reader control panel, which number has been read by the operator from the top card of the stack. Indexing of this number manually furnishes a check that the correct stack of cards and the correct tape are being used, since the number indexed manually will be the same as the control number on the control card, and should be the same as a control number to be read from the first frame of information on the tape.

Operation of the feeder is then initiated, so that the first ledger card is fed from the feeding device 32 to the accounting machine 31. The account number is picked up from the card by the accounting machine in the manner previously described, and is electrically compared with an account number which has been entered into storage switches in the tape-reading unit 33 by the manual indexing means. Since the control number which has been indexed manually into the storage switches by switch control means on the reader control panel 80 will compare properly with the control number read from the control card, the accounting machine 31 will make a balance pick-up operation, and an operation of the reader will then be initiated. The comparator number contained in the first frame of information on the tape 79 will be sensed by the tape reader 75, and will be compared with the control number manually indexed on the reader control panel 80.

If the control number read from the tape corresponds to the control number manually indexed, a signal is generated by the comparator mechanism to operate the tape reader 75. Although the first frame of information on the tape is purely for comparator checking purposes, spurious additional information is contained on this frame to effect a cycling of the accounting machine 31, so that the proper sequence of operations is performed to condition the system for subsequent reading of the first frame of true account information from the tape.

If, on the other hand, the control number read from the tape does not correspond to the control number manually indexed, the accounting machine is controlled to make a new balance operation, and the control card is ejected from the accounting machine as the first true account card is fed by the feeder 32 into the accounting machine. The comparator number is sensed from this card and compared by the system with the number read from the tape. Since this number will not correspond to the stored number, this account card is ejected, and another card is fed by the feeder 32 to the accounting machine 31. Since the control number stored will not correspond to any of the account numbers on the ledger cards, this process of feeding and ejecting cards will continue until a card count control mechanism in the system functions to lock the system against operation. This device counts the number of cards consecutively fed into the accounting machine and rejected, and locks the machine after a predetermined number of such operations. This is effective to inform the operator that there has been a comparison failure, and steps may then be taken to check the tape against the card stack, and to select another tape or another card stack so that the two match, for proper operation of the system.

It will be recalled that the information previously read from the tape was initial control information for checking the proper matching of the ledger card stack and the punched paper tape. Now, when the reader starts to read the next frame of information, the next thing to be read is the account number of the first account to be posted. This new account number which is entered into the accounting machine does not, of course, correspond to the control number which was read from the control card previously entered into the accounting machine. This lack of correspondence is effective to cause the accounting machine to perform a new balance operation and eject the control card.

The card feeder then feeds the next card of the stack into the accounting machine while simultaneously ejecting the control card. A pickup of information from this card is then attempted by the accounting machine. If the account number on the card corresponds to the account number entered into the storage switches from the punched paper tape, the account card is retained in the machine in preparation for posting operations upon it. However, if the account number on the card does not correspond to the account number on the tape which has been entered into the storage switches, this account card is ejected, and another account card is fed into the accounting machine from the feeder, at which time its account number is compared with the number entered into the storage switches from the tape.

Let it be assumed that the first check or deposit to be posted is on the No. 3 account, said account being contained on the third card in the stack. It will, therefore, be seen that the account numbers on the first two cards of the stack will not agree with the account number read from the tape and entered into the machine, and that these cards will, accordingly, be ejected immediately rather than be retained in the accounting machine for posting. As the No. 2 card is ejected, the No. 3 card is fed into the machine, and the account number on this card is found to correspond to the account number stored in the storage switches from the tape, causing the accounting machine to pick up all of the information such as old balance, etc., contained on the No. 3 account card and enter such information into the accounting machine.

As the pickup cycle of the accounting machine is completed, the reader starts operating and completes reading of the information contained on the frame which was started with the account number. The transaction information and the amounts are read from the tape, causing the keys on the keyboard of the accounting machine to be depressed, after which a trip symbol is read, causing said machine to be tripped for a cycle of operation. The amount information and the control information, which relates to whether the amount is a check or a deposit, are thus entered into the machine, and, upon completion of the cycling of the machine, the reader is started again to read the next account number.

In connection with the initial comparison of the control number on the tape with the number on the control card, it will be noted that if the stack of cards and the tape do not correspond, the number on the tape will be shown on a visual comparator number screen on the control panel 80 of the reader and will, as previously stated, cause insertion and ejection of ledger cards under short-cycle operations of the accounting machine until operation of the system is cut off under control of the card count control mechanism.

In connection with the description of a posting operation, it is noted that if the initial pick-up of information from the ledger card by the accounting machine was incorrect in any respect, a so-called "gate check" results, which prevents further operation of the system until the error condition is corrected. This is effected by a "gate check" signal being transmitted from the accounting machine 31 to the tape-reading unit 33, which prevents the tape reader 75 from operating and, accordingly, terminates operation of the system until the error is corrected.

Furthermore, if an account card becomes filled with recorded information during a posting operation, a signal is generated to lock the system against further operation until a new card for that account has been provided by the operator.

If an overdraft or negative balance has been picked up by the accounting machine, a signal is generated by the accounting machine. The manner in which this overdraft signal is utilized is dependent upon the setting or condition of the overdraft control switches on the control panel

80. One or more of several different alternatives may be accomplished under control of the overdraft signal according to the setting of these switches. The first of these is that the overdraft signal is transmitted to the tape reader to prevent further operation of the reader. The automated system is thus locked against further operation until such time as an operator investigates and makes a decision as to what should be done with the overdraft balance.

A second alternative is that the overdraft signal may be sent to the feeder 32 to cause the ledger cards containing these overdraft balances to be sorted to a separate bin in the feeder, so that they are segregated for special treatment after the run of accounts has been completed. This sorting feature can be disabled if desired.

A third alternative is that the overdraft signal may be used to prevent the accounting machine from making a new balance operation at the conclusion of reading of all of the frames of information related to the account upon which an overdraft balance has been noted. The accounting machine is caused to lock up when trying to make a new balance operation, and operation of the system is thus suspended, so that an operator may investigate and decide what is to be done with the particular account involved. It should be noted that the overdraft control mechanism can be conditioned to "remember" an overdraft condition throughout the posting of an account, or not, as desired. Certain combinations of the above alternatives are also available.

The manner in which the various components of the tape-reading device function in the proper timed relationship will now be described. In the event that there is no overdraft condition from the balance pick-up, and that the pick-up of information from the ledger card by the accounting machine is correct, then a signal is transmitted from the accounting machine to initiate operation of the reader by tripping a single-revolution clutch to cause rotation of the cam line of the tape reader 75. As the cam line rotates, it allows the sensing mechanism of the tape reader to sense for perforations on the tape, thereby operating the sensing switches which are contained in said tape reader.

The information-bearing signals generated from the tape by the tape reader 75 pass through a decoding network and are transmitted to a routing switch while a timing signal is simultaneously transmitted to the routing switch from cam-controlled switches in the tape reader. The timing signal is effective to cause the routing switch to be set so that signals from the tape reader which have been picked up from the tape and encoded to a suitable form are switched through the routing switch to the appropriate key bank solenoids of the accounting machine.

Continued rotation of the cam line of the tape reader 75 causes another signal to be transmitted to the routing switch to cause it to switch to the next position. At this time, the application of power to the key-bank solenoids of the accounting machine which were energized previously for indexing into the accounting machine of information read from the tape has been terminated by another switching means.

At the same time, the rotation of the cam line prepares the tape-reading unit for initiation of its next reading cycle. If there is no disabling condition, a signal is generated to enable the tape reader 75 to commence the next reading operation. From this point on, the reading of information on the tape is in proper sequence to set or index all the banks of solenoid-operated keys on the accounting machine according to the information contained in the punched paper tape.

A trip symbol is included on each frame of information on the tape and is the last item read on each frame. Reading of a trip symbol by the tape reader 75 results in generation of a first signal to cause termination of the reading operation. Also, a second signal is generated to trip the accounting machine for entry of the item, such as check or deposit, which has been indexed on the keyboard of the accounting machine through energization of the key-bank solenoids. Thirdly, a signal is generated to cause the signal-routing switch to return to its "home" position in readiness for the reading of the next frame of information from the tape.

Tripping of the accounting machine for cycling generates a signal which is effective to remove the "trip" information from the accounting machine, and also is effective to initiate an operation of the tape-reading unit when the accounting machine has completed cycling, if such operation is not otherwise disabled due to other conditions within the system.

In the event that the cycling of the accounting machine has caused the last line on the ledger card to be used, a switch in the accounting machine is closed to generate a signal to prevent operation of the tape reader 75. A new account card may then be started, through the procedure of having the operator make a manual new balance operation on the accounting machine with the old card therein; making a balance pickup operation from the old card; removing the old card; inserting a new account card; and taking a sub-balance on said new card. Automatic operation of the system may then be commenced by manual operation of a switch on the control panel 80.

When a new frame of information is presented on the tape to the tape-reading unit, initiation of reading is caused by completion of the cycling of the accounting machine and its return to home position. Upon such completion, a signal is generated to start rotation of the cam line of the tape reader 75. The reader 75 is thereby rendered effective to read the account number information by means of a plurality of switches which are set by sensing means in accordance with information encoded on the tape. At the same time, the previously-mentioned routing switch is operated to select the proper account number storage switch corresponding to the order or denomination of the account number read from the tape, for transmission of the tape-generated signal to said storage switch.

If the account number in the hundreds order sent to the corresponding comparator storage switch is the same as the number previously stored in said switch, a signal is sent to a parity-checking and answer-back network for comparison with a signal sent from the switches operated by the tape-sensing means for checking of parity. If the combination of signals in the parity-checking and answer-back network indicates a proper checking, a signal is then sent to the tape reader 75 for operation and reading of the next order of the comparator number from the tape.

In the event that the comparator storage switch has another number stored therein than has been read from the tape, then the storage switch corresponding to the selected order or denomination steps until the position of the switch agrees with the number that has been read from the tape. Stepping of the switch causes a signal to be generated, indicating a change of the comparator number. Such a signal is effective, at the conclusion of reading of all of the orders of the comparator number, to cause a new balance operation of the accounting machine.

When the comparator storage switch has stepped to the position indicated by the information transmitted to it from the tape reader 75, a signal is sent to the parity checking network, which signal is compared with the signal sent thereto from the switches operated by the tape-sensing means in the manner previously described. If the two signals check, indicating even parity and proper positioning of the storage switch, a signal is generated to cause reading of the second order of the comparator number. If, however, there is no parity check, a signal is sent to the visual comparator indication on the panel 80 to light the visual comparator indicator, thus indicating an incorrect comparison. Also, a signal is generated to enable manual positioning of the comparator stepping switch means, and another signal acts to disable the tape reader against further operation.

Reading, storage, and comparison of the second and third order comparator numbers are the same as those described above for the first order. In addition, on the third order operation, a signal is generated for determination of whether the system should continue to read, or whether there should be a new balance operation. In the event that all of the comparator numbers read from that frame of the tape correspond to the previous setting of the comparator storage switches, the decision is made to continue to read, and a signal is generated to initiate reading of the tape for another posting operation. If, on the other hand, one or more of the comparator numbers read from that frame of the tape do not correspond to the setting of the corresponding comparator storage switches, a decision is made to effect a new balance operation of the accounting machine. It, of course, is assumed that no disabling signal has been generated by the overdraft control means of the accounting machine to prevent initiation of a new balance operation.

At the same time that a signal was being sent from the comparator storage switches to the parity-checking network for parity checking, a signal was also sent from the comparator storage switches to the visible comparator indication means on the panel 80 to cause illumination of the visual comparator indicator to provide visual indication of the comparator number which was just read from the tape.

It will be noted that as each of the three orders of the comparator number is read from the punched paper tape, the corresponding comparator storage switch which performs account number comparison with the account number read by the accounting machine from the ledger card is also conditioned for operation. The comparator storage switches then perform their comparison function when a comparator number is read by the accounting machine incident to the feeding of the next ledger card into the accounting machine.

In the above description of the functioning of the comparator number means, it should be kept in mind that the parity check is operative only with the comparator numbers and not with the various amount numbers and other information read from the tape.

DETAILED DESCRIPTION

*Tape-Reading Unit*

As shown in the perspective view of FIG. 1, the tape-reading unit 33 of the present invention includes a mechanical tape reader 75 mounted on a cabinet 76. Also included in the assembly are supply and tape-up reels 77 and 78, respectively, for the tape 79, and a control panel 80 mounted flush with the top of the cabinet 76. Electronic components used in connection with the reading of information from the tape and the transmission thereof to the accounting machine 31 are housed within the cabinet 76. Casters 81 are provided on the cabinet 76 to enable the tape-reading unit to be moved readily from place to place.

The tape reader includes a plurality of paired electrical contacts 82 (FIG. 3), which are disposed on a supporting structure 83, which is mounted on a base casting 84. Inasmuch as the present device is designed to sense any one of eight holes, or any combination thereof, in the control tape, there are eight contacts under the control of tape perforations. The contacts in the oppositely-disposed rows are arranged on the supporting structure 83 in staggered relation, so that they may be individually controlled by interposer mechanism which will be more fully descriped at a later point.

Each pair of contact devices consists of a fixed conducting strip 85, on one end of which is a contact point, and a resiliently-movable conducting strip 86, which carries a contact point in registration with the one on the fixed strip 85 with which it is paired. The resilient conducting strip 86 is normally biased to close the contact points. Each contact device, however, is held open, except when a corresponding tape perforation appears, by means of an offset contact lever 87, which is mounted for limited swinging movement on a pivot shaft 88, which forms part of the supporting structure 83. Each of the contact levers 87 has a free end 89, which, when moved outwardly, causes the contact-operating end thereof to move outwardly. The contact-operating end of each lever has pivoted thereto a short, outwardly-extending insulating link 90, which is notched to engage an outwardly-extending pin 91 fixed to one of the associated resilient contact strips 86. As a result of this structure, when the free ends 89 of the contact levers 87 are moved outwardly, the opposite ends move outwardly, whereby the contact points on the associated circuit maker are opened.

The contact levers 87 are guided in their movement by a pair of guide combs 92. The movement of these levers is partially under control of a pair of contact lever bails 93, one such bail being associated with each row of contact levers, and being adapted to engage the free ends 89 of the contact levers. Thus, when the contact lever bails 93 are moved toward each other, any contact lever which is at such time otherwise free will permit its associated resilient conducting strip 86 to move inwardly to close the contact thereof. The contact lever bail assembly includes a pair of yoke-like members 94, each comprising a pair of spaced arms 95 interconnected by the contact lever bail 93. One end of each arm is pivoted on the pivot shaft 88, and the other end of each has mounted thereon a roller 96. The contact lever bail assemblies are urged toward each other under the influence of the resilient contact strips 86, but they are normally kept in separated position by means of interposer bail studs 97, which are adapted to move between the rollers 96 at each end of the assembly. When the studs 97 are disposed between the rollers 96, the contact lever bail assemblies are separated, the contact lever bails 93 are in contact with the free ends 89 of the contact levers, and, as a consequence, the contact points of the circuit makers are opened.

The studs 97 are carried by an interposer bail assembly 98, which in turn is pivoted on a pivot shaft 99. The interposer bail assembly 98 includes a pair of spaced side arms, on the free end of each of which is located one of the studs 97, from which location said stud projects into position between the rollers 96. An interposer bail 101 interconnects the side arms of the interposer bail assembly, and this bail is adapted to overlie and control a series of interposers, as will more fully appear hereinafter. Furthermore, the interposer bail assembly has attached thereto an interposer bail arm 102, by means of which the forwardly-projecting arms 98 may be rocked about the pivot shaft 99, on which they are mounted. The free end of the interposer bail arm 102 has a cam follower 103 mounted thereon, adapted to operate in cooperative relation with an interposer bail cam 104 fixed on a shaft 105, being urged into engagement therewith by a spring 106.

The operation of the tape-controlled contact assembly is under the ultimate control of a series of interposer arms 107 (FIG. 6), attached to reading pins 109, one such arm being provided for each tape-controlled contact lever 87. The interposer arms 107 are freely pivoted on the shaft 99, on which they are mounted, and each consists of a lever having a pair of interposer shoulders 108 (FIG. 5) formed at the free end thereof. One shoulder 108 of each interposer arm is associated with the free end 89 of its corresponding contact lever 87. In the inoperative, or non-reading, position of the device, each interposer arm is positioned as shown in FIG. 6 of the drawings, with one of its shoulders 108 in the path of movement of its associated contact lever, but normally out of engagement therewith. It will be seen, therefore, that, even though the contact lever bails 93 are released, any contact lever whose interposer arm 107 is in blocking position will be restrained from movement, and consequently its associated contacts will remain open.

Coupled to each interposer arm is a reading pin 109, which is guided for reciprocating movement in a reading pin guide block 110. The path of the reading pins 109 intersects a tape feed throat 111 in the guide block 110. As a perforated tape is intermittently fed through the tape feed throat 111, the reading pins 109 are allowed to come into light contact therewith by reason of the fact that each interposer arm 107 is under the influence of a light spring 112. The tension of the spring 112 is insufficient to cause any damage to the tape being read. However, the spring tension is sufficient to cause the reading pin 109 to enter a tape perforation in alignment therewith at the reading station. When this relationship is present, the corresponding pin 109 will enter the tape perforation, causing the interposer arm 107 to swing on its pivot shaft 99 sufficiently to withdraw the blocking interposer shoulder 108 from the path of its associated contact lever. Under these conditions, when the contact lever bails 93 are moved inwardly away from the free ends of the contact levers, a contact lever thus freed will move sufficiently to close its associated contact points. In the absence of a perforation in the tape, the reading pins will rest lightly upon the surface thereof, thus preventing the associated interposer arms 107 from moving out of the path of their associated contact levers, thereby blocking the levers against movement and avoiding the operation of their associated contacts.

Whenever the interposer bail 101 is in its depressed position, the interposer arms 107 will be held in non-reading position. It will be noted that the interposer bail 101 overlies and is adapted to contact the upper edge of the aligned interposer arms. The interposer arms 107, and consequently the reading pins 109, are retained in non-reading position by the interposer bail 101 until the interposer bail arm 102 is permitted to move clockwise, as viewed in FIG. 3, under the influence of the spring 106, by rotation of the cam 104 to a position in which a low portion of said cam is adjacent the follower 103. The bail 101 is then moved upwardly, freeing the arms 107 for movement under influence of the springs 112, so that said arms carry the pins 109 upward in sensing movement. Where a perforation in the tape is positioned opposite a pin 109, said pin continues upwardly until the shoulder 108 on its associated arm 107 rises above the end 89 of the adjacent lever 87, thereby permitting the contacts 82 of its circuit maker to close.

Fixed on the shaft 105, in addition to the interposer bail cam 104, is a tape feed cam 120 (FIG. 5), which controls the feeding of the punched paper tape through the tape reader unit. As will be subsequently explained, the shaft 105 completes one full revolution for each character read from the tape, and the cam 120 enables the tape to be fed the proper amounts subsequent to sensing of the character, so that the tape is properly positioned relative to the pins 109 in readiness for the next sensing operation.

Figure 3:
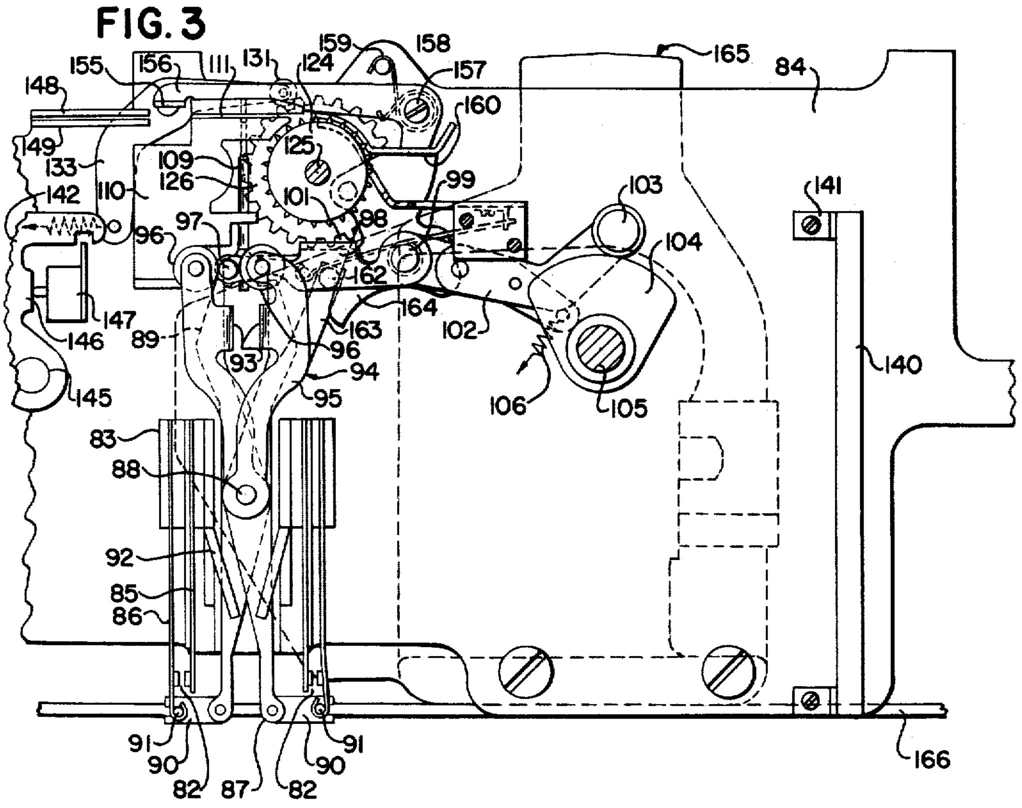
FIG. 3 is a detail view of the mechanical tape-sensing means used in reading the punched paper tape.

The character-representing perforations in the tape are arranged in transverse rows that are equally spaced, and the successive rows of perforations therefore present themselves for sensing by the pins 109, as the tape is moved through the reading throat 111, in step-by-step progression. The tape is provided along its length with sprocket holes with which the teeth of a pin wheel 124 (FIG. 3) are adapted to engage for feeding the tape through the reading throat 11. The pin wheel 124 is carried by a shaft 125, which is rotated in a bearing in the casting 84 by a feed ratchet wheel 126 (FIGS. 3 and 5).

Free on the pivot shaft 99 is a feed lever 121, which has mounted on one end thereof a cam follower 122 adapted to cooperate with the cam 120 and urged into engagement therewith by a spring 123. A feed pawl 127 is pivoted on a stud 128 carried at the other end of the lever 121, and is urged clockwise with respect to the lever 121, as viewed in FIG. 5, by a spring 129 secured at one end to the pawl 127 and at the other end to the lever 121, to engage peripheral teeth on the feed ratchet wheel 126. The pawl 127 is thus operative to rotate the ratchet wheel 126 periodically in response to rotation of the cam 120, as may be required for proper feeding of the tape. Counter-clockwise movement of the pawl 127 is limited by an adjustable stop member 130 secured to the casting 84.

It will be seen that rotation of the shaft 105 and the cam 120 fixed thereon is effective to cause a clockwise rocking of the lever 121 in such manner as to impart an upward movement to the pawl 127. This upward movement is effective to cause the ratchet wheel 126 to be rotated clockwise for a distance corresponding to the space on the tape between two adjacent characters. The cam 120 is of such configuration that, upon completion of feeding by the pawl 127 of the wheel 126, the lever 121 is caused by its spring 123 to return in a counter-clockwise rocking movement to the position in which it is shown in FIG. 5, thus carrying the pawl 127 back with it and positioning said pawl with respect to the ratchet wheel 126 for another subsequent feeding operation.

Figure 5:
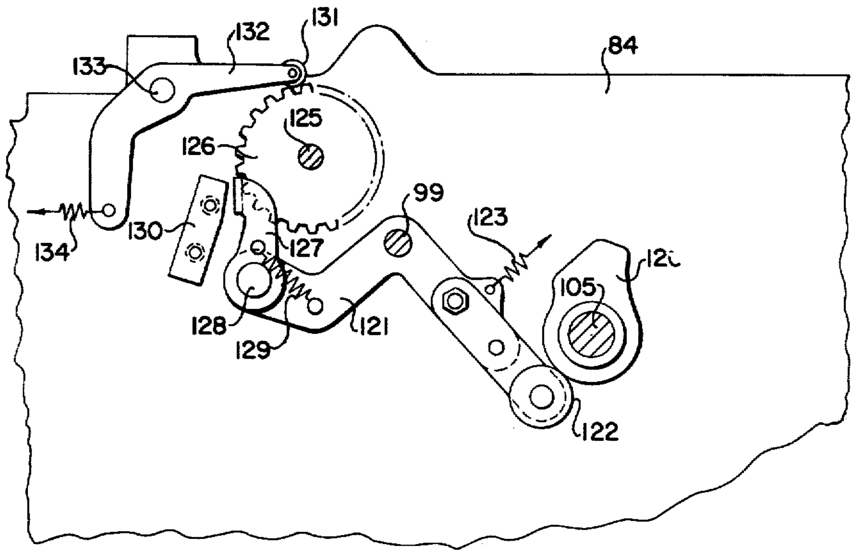
FIG. 5 is a detail view of the tape-feeding mechanism for the tape reader.
Figure 6:
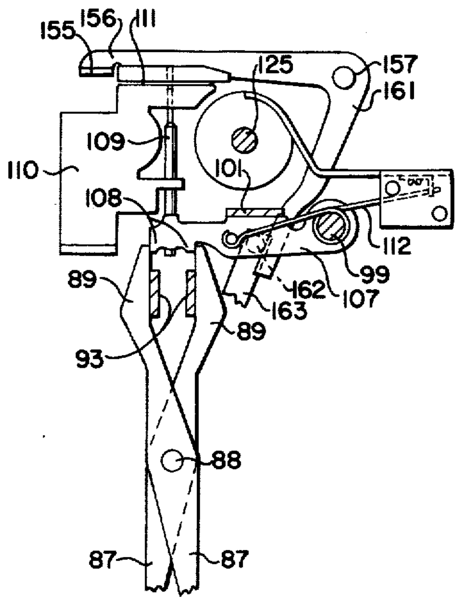
FIG. 6 is a detail view of the means for controlling the tape-reading pins and the associated contact levers.

Retrograde movement of the ratchet wheel 126 during return of the feed pawl 127 from its advanced position to the position in which it is shown in FIG. 5 is prevented by a roller 131, which engages the teeth on the wheel 126. The roller 131 is mounted on one end of a lever 132, pivoted at 133 to the casting 84. A spring 134, secured to the other end of said lever, urges it clockwise, as viewed in FIG. 5, so that the roller 131 is constantly urged into engagement with the teeth on the wheel 126. This mechanism is thus effective to stabilize the position of the ratchet wheel 126 and to prevent retrograde movement of said wheel during the return movement of the feeding pawl 127.

Figure 8:
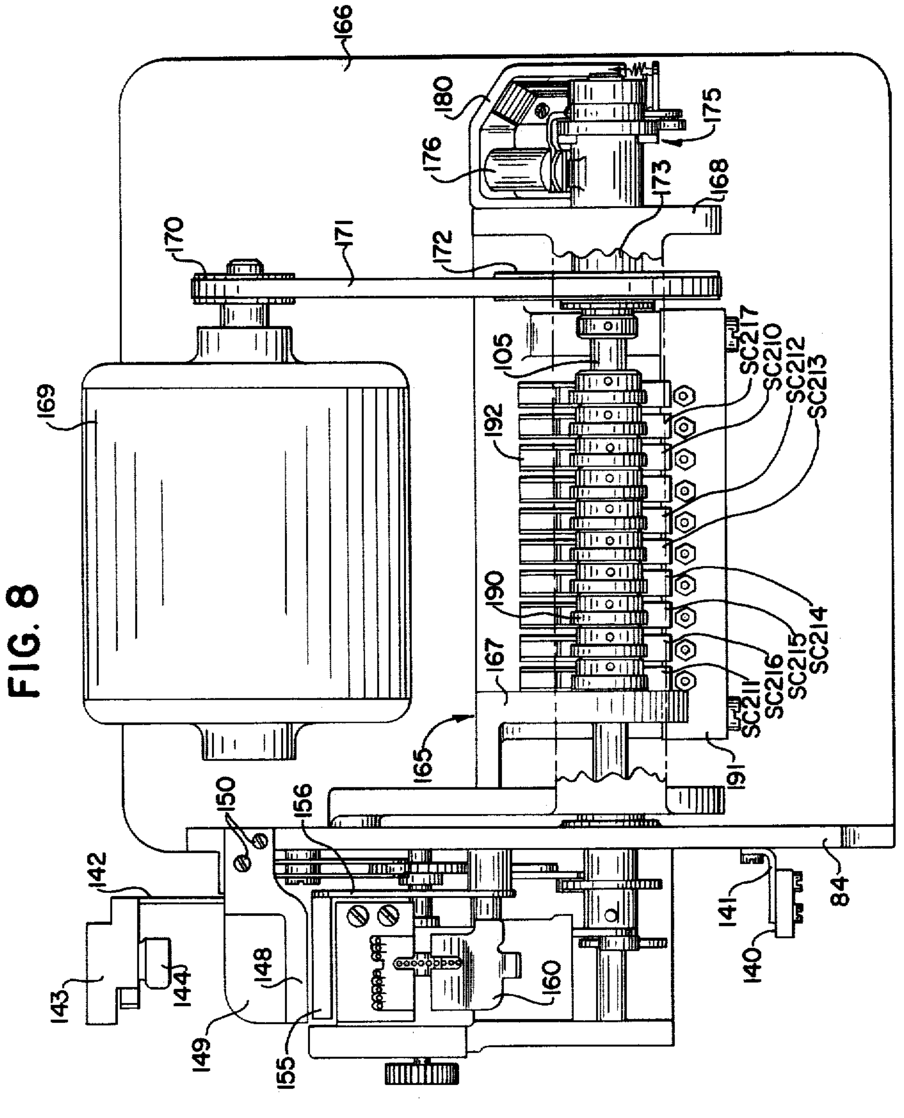
FIG. 8 is a plan view of the tape-reading unit.

As shown in FIGS. 3 and 8, certain additional components are secured to the casting 84 to perform various functions in the operation of the tape-reading unit. A program board 140 is secured by means of brackets 141 to the casting 84, and serves as a means by which the circuit makers formed by the contacts 82 may conveniently be incorporated into the circuit for the remainder of the system in which the tape-reading unit is used.

A lever 142 (FIGS. 3 and 8) is pivotally mounted on the casting 84 by means of a pivot 145 and is provided at its free end with two plates 143 and 144, between which the tape normally travels. A surface 146 on the lever 142 is arranged in cooperative relation with the actuator of a snap-action switch 147, comprising contacts SC250, fixed to the casting 84. In the event of blocking of the tape feed to the reading unit, the tape will become tight as it is fed through the sensing section, and will cause the lever 142 to be rotated clockwise, as viewed in FIG. 3. In such a case, the surface 146 will engage the actuator of the switch 147 to operate said switch, opening the contacts SC250. The manner in which the contacts SC250 function in the circuitry of the system will be described subsequently.

Additional guides 148 and 149 are secured to the casting 84 between the plates 143 and 144 and the throat 111, in order that the tape may be properly guided to the throat. Immediately to the right of the guide plates 148 and 149, as viewed in FIG. 3, is positioned a plate 155, which is fixed to the end of a lever 156 rotatably mounted on a pivot 157 secured in the casting 84. A spring 158, secured at one end around the lever 156, extending around the pivot 157, and secured at the other end to a stud 159 in the casting 84, urges the lever 156 clockwise, as viewed in FIG. 3. The plate 155 is positioned beneath the tape to be sensed by the tape-reading unit, and is urged upwardly against the tape by the spring 158, so that if the supply of tape is exhausted, the spring 158 will cause the lever 156 to be rotated clockwise. An arm 161 (FIG. 6) is integral with the lever 156 and is located and arranged to engage a stud 162 on a lever 163, when the lever 156 is rotated clockwise, to shift said lever to operate a set of contacts 82, at the ends of a pair of strips 85 and 86. The manner in which these contacts, designated SC209 in the circuit diagram, function in the operation of the circuitry of the system will be subsequently described.

A tape hold-down lever 160 is formed with an arcuate portion to hold the tape against the pin wheel 124 and to guide the tape as it is being advanced. When the tape hold-down lever is in its open position, a finger 164, integral with the lever 160, is rocked into engagement with the stud 162 on the lever 163 to shift said lever to operate the same contacts SC209 as were described in connection with the lever 156.

A shaft-bearing frame, shown generally as 165, and a base plate 166 are secured to the casting 84 on the other side of said casting from the tape-sensing mechanism. The shaft 105 extends through the casting 84 and is journaled in support members 167 and 168, which form part of the frame 165. A motor 169 is fixed to the base plate 166 and drives a pulley 170, which is connected by a belt 171 to a pulley 172 fixed to a hub 173 on the shaft 105.

Figure 4:
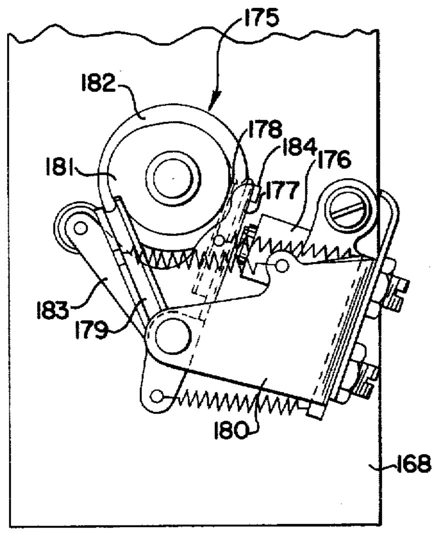
FIG. 4 is a detail view of the clutch mechanism for engaging and disengaging the cam line of the tape-reading device with and from the motor which powers it.

The pulley 172 may be operatively coupled to the shaft 105 to drive said shaft by means of a single-revolution clutch, shown generally at 175 in FIGS. 4 and 8. The clutch 175 is of the conventional one-revolution type and is controlled by a clutch trip magnet 176, which, when energized, will remove a pawl or block 177 from a projection 178 on the hub 173 to allow the clutch to operate to drive the shaft 105.

A retaining pawl or block 179 (FIG. 4) is pivotally supported on the same bracket 180 which supports the clutch trip magnet 176 and the block 177. The retaining block 179 cooperates with a projection 181 on the clutch 175 to position the clutch and to prevent undesirable counter-clockwise movement, as viewed in FIG. 4, of the clutch. An armature cam 182 forms part of the clutch mechanism and cooperates with an armature knock-off arm 183, which is pivotally mounted on the bracket 180 and is provided with a finger 184 to positively shift the block 177 out of engagement with the armature of the magnet 176 at the proper time in the revolution of the clutch 175.

It will be seen that the shaft 105 is operatively engaged with the pulley 172 for one revolution by selective energization of the magnet 176. Rotation of the shaft 105 will be limited to a single revolution unless the magnet 176 is reenergized to permit a second revolution of the shaft 105 to take place.

A plurality of cams 190 are fixed to the shaft 105 between the members 167 and 168, and are used to operate sets of contacts SC210 to SC217 inclusive, which function in the electrical circuitry in a manner which will be subsequently described. A contact mounting block 191 is secured to the frame 165 and extends parallel to the shaft 105. The block 191 in turn supports a plurality of contact supporting blocks 192, one block 192 being provided for each cam 190. The position of each block 192 with respect to the block 191 may be adjusted by means of screws 193 and 194 in the block 191.

Figure 7:
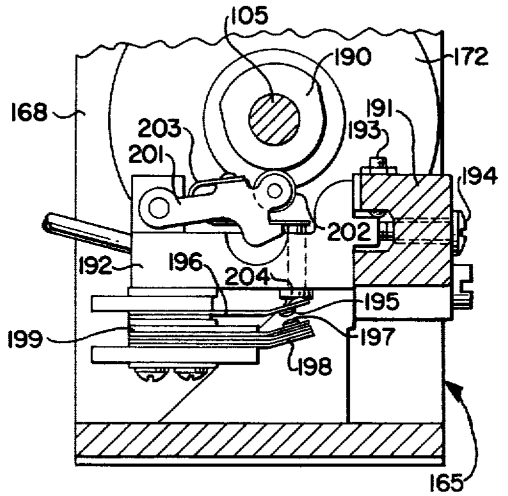
FIG. 7 is a detail view of the means for operating the contacts controlled by the tape reader cam line.

An upper contact 195 is fixed on a strip 196 for cooperation with a lower contact 197 fixed on a plurality of strips 198 stacked to provide the desired degree of stiffness. The strips 196 and 198 are assembled on a supporting structure 199 secured to the block 192. Pivotally mounted on each block 192 is a follower 201, provided at its free end with a roller 202. Secured to each follower 201 is a stiff, U-shaped spring 203, at the free end of which is secured an actuator 204, which extends through a hole in the block 192 and engages the strip 196. The resiliency of the strip 196, acting through the actuator 204 and the spring 203, is sufficient to maintain the roller 202 of the follower 201 in engagement with the cam 190. Therefore, during the revolution of the shaft 105, when a high portion of the cam 190 comes into engagement with the roller 202, the follower 201 is rocked clockwise, as viewed in FIG. 7, and acts through the actuator to cause the strip 196 to be shifted downwardly, so that the contacts 195 and 197 engage, thus completing the circuit through the strips 196 and 198. As the cam 190 continues to rotate, a low portion of said cam is presented to the roller 202, and the follower 201 and the actuator 204 return to the position in which they are shown in FIG. 7 under the influence of the resiliency of the strip 196 to separate the contacts 195 and 197 and open the circuit extending therethrough.

It will thus be seen that a plurality of cam-controlled contacts, operable at selected times during the revolution of the shaft 105, have been provided. The manner in which these contacts function to control the various components of the system will be subsequently described.

*Accounting Machine Keyboard Operating Means*

Operating means are provided which can be attached to the keyboard of a conventional accounting machine 31 of the type disclosed in the previously-mentioned United States patent application, Serial No. 610,754, to operate the keyboard in accordance with information read from the perforated paper tape 79 by the reading unit 33.

Figures 9, 10:
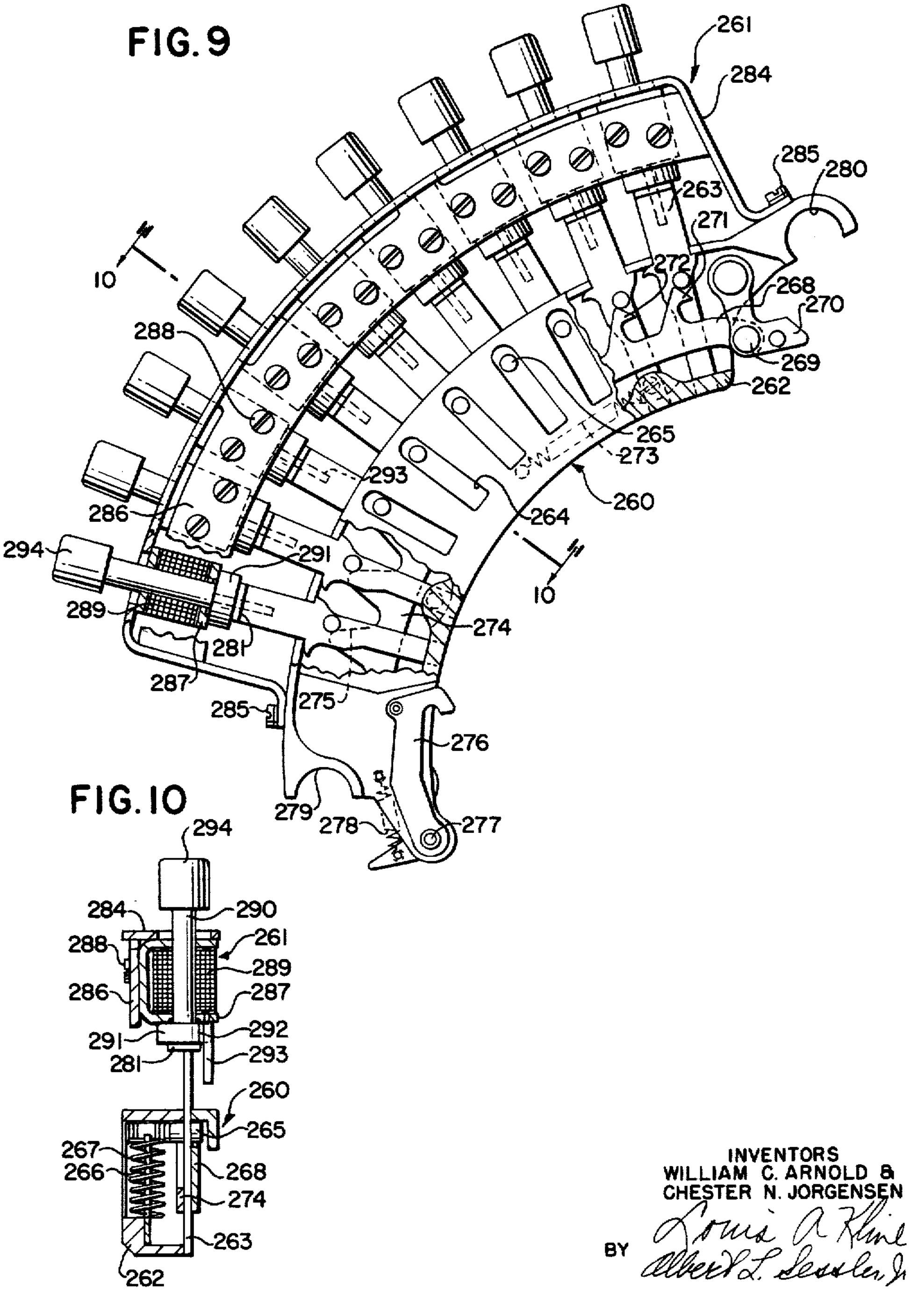
FIG. 9 is a sectional view of an amount bank of the accounting machine, showing the solenoid-type operating means for actuating the keys of the accounting machine.
FIG. 10 is a sectional view taken on line 10—10 of FIG. 9, showing a cross-sectional view of one of the keys and its associated solenoid-type operating mechanism.

Shown in FIGS. 9 and 10 is one of the conventional amount key banks 260 of an accounting machine of the type described above. Superimposed over this bank and secured thereto is a unit 261 for controlling the keys of the key bank 260 in accordance with electrical impulses received from the reading unit 33.

The conventional key bank 260 includes a key frame 262, in which are positioned a plurality of keys 263, nine in the illustrated embodiment. Slots 264 in the key frame 262 cooperate with studs 265 in the keys to guide the keys for sliding movement in a direction which is radial to the arcuate form of the key frame 262. The keys 263 are normally urged toward an undepressed position by a spring 266, supported by a member 267 and extending between the key frame 262 at the lower end of the spring and the stud 265 at the upper end of the spring.

A detent 268 is mounted within the key frame 262 at one end by a pivot connection 269 to an arm 270, which, in turn, is pivoted to the key frame 262. The detent 268 is similarly mounted at its other end, so that it may partake of movement transverse of the keys 263 within the key frame 262. Hook formations 271, on the detent 268, having cam surfaces 272 thereon, cooperate with the studs 265 on the keys 263. Depression of one of the keys 263 causes its stud 265 to engage the surface 272 on the corresponding hook of the detent 268 to shift said detent to the left, as viewed in FIG. 9, permitting full depression of the selected key 263. As the stud 265 of the depressed key passes the hook formation 271 on the detent 268, said detent shifts upward and to the right, as viewed in FIG. 9, thereby positioning the hook formation 271 over the stud 265 of the depressed key 263 to retain said key in depressed position. It will be seen that a spring 273, connected at one end to the frame 262 and at the other end to the detent 268, urges the detent to the right, as viewed in FIG. 9.

In the event that the wrong key is inadvertently depressed, it will be seen that this situation may be corrected by depression of any of the other keys in the key bank, which will rock the detent 268 to the left, thus releasing the originally-depressed key.

An additional detent 274 is also slidably mounted within the key frame 262 and is provided with cam surfaces 275 for engagement with the studs 265 of the keys 263. The detent 274 controls a zero stop pawl 276 in a well-known manner, causing the zero stop pawl 276 to be shifted counter-clockwise, as viewed in FIG. 9, about its pivot 277 against the force of the spring 278 whenever a key in the key bank 260 is depressed.

The key bank 260 is mounted in its proper position in the accounting machine by positioning two arcuate surfaces 279 and 280 of the frame 262 on a pair of rods (not shown) forming a part of the accounting machine structure.

To adapt the key bank 260 for use with the control unit 261, the key tips used in the conventional machine are removed, and a small flat plate 281 is secured to the top end of each key 263. The control unit 261 is enclosed within a frame 284, which extends over the key bank 260 and is secured thereto at the upper and lower ends by means of screws 285 or other suitable fastening means. A side frame 286 is fixed to the frame 284 and supports a plurality of solenoid brackets 287, one for each key position, which are secured to the frame 286 by means of screws 288. A solenoid 289 is contained within each bracket 287 and is connected by suitable wiring to the reading unit 33, from which it receives electrical signals according to the information read from the perforated paper tape.

Each solenoid 289 is provided with a core 290, to the lower end of which is secured a plate 291, which is notched at 292 to receive a pin 293, secured to the bracket 287. The pin 293 functions to prevent turning movement of the plate 291 and the core 290 to which the plate is secured. The upper end of the core 290 extends through openings in the bracket 287 and the frame 284 and has attached thereto a key tip 294, of conventional design, on which appropriate indicia, such as a number or a symbol, may be placed.

It will be seen that when power is applied to any one of the solenoids 289 of the control unit 261, the core 290 of that solenoid will be shifted downwardly, so that the plate 291 engages the plate 281 and depresses the key 263 in the same manner as said key would be depressed manually in a conventional accounting machine. The solenoid core 290 may also be shifted downwardly by the key tip 294 to depress the key 263 in the event that a manual operation is desired, in which an operator depresses the key tip 294.

The control unit 261 shown in FIGS. 9 and 10 therefore provides for electrical operation of the keys of the accounting machine keyboard under control of the reading unit when desired, while at the same time permitting manual operation of the accounting machine by depression of the key tips 294, when appropriate.

*Reader Control Panel*

The reader control panel 80 (FIGS. 1 and 2) is provided for the reading unit 33, and is positioned on the cabinet 76 immediately in front of the reader 75. That portion of the cabinet 76 on which the panel 80 is located is tilted slightly from the horizontal in order to provide for more convenient access to and observation of the panel 80. This panel contains switches for controlling various functions of the system and also contains indication means which describe the condition of the system to the operator and also give visual indication of the account number pertaining to the account being processed by the system at any given time. The control panel 80 is secured to the cabinet 76 by any suitable means.

Figure 2:
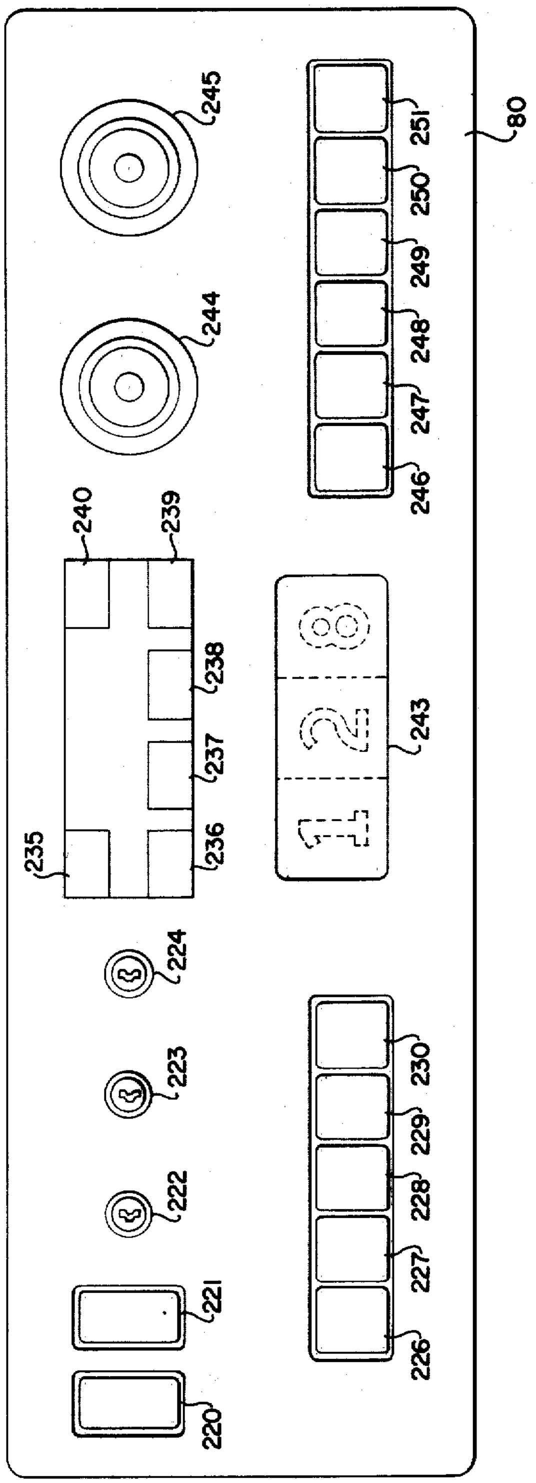
FIG. 2 is a plan view showing the control board of the tape-reading device.

At the upper left corner of the panel 80, as viewed in FIG. 2, are two toggle-type switches, 220 and 221. The switch 220 controls the power contacts ST201, which control the application of power to the operating system. The control switch 221 controls the contacts ST250, which determine whether the accounting machine of the system is to be placed on automatic or manual control. Immediately to the right of the switches 220 and 221 are three key-controlled switches 222, 223, and 224. These switches control the contacts ST260, ST261, and ST262, respectively, which contacts may be selectively operated to determine the type of action to be taken by the system in the event of an overdraft balance being calculated by the accounting machine.

In the lower left portion of the panel 80 are located five horizontally-aligned push buttons 226 to 230 inclusive. These push buttons control certain contacts, which, in turn, control predetermined functions of the reading unit. The push button 226 controls contacts SP280, which control a reader-starting function. The push button 227 controls contacts SP281, which function to stop operation of the reader. The push button 228 controls contacts SP282, which control homing of certain multiple-position switch units in the system. The push button 229 controls the contacts SP260, which, in turn, control a tape-skipping function. The push button 230 controls the contacts SP261, which control resumption of reading operations.

The central portion of the panel 80 is given over to indicating means. In the upper portion of this panel are a plurality of small individual indicators 235 to 240 inclusive. These indicators give indication, respectively, of the following conditions: Power on; overdraft; line 40, which indicates that an account card is filled; gate check, which indicates incorrect pick-up of information from a card; parity check; and card reset.

Below the individual indicators 235 to 240 is a panel 243, which functions to provide visual indication of the account number of the account being processed at any time during operation of the system. A three-digit number is shown in this panel in the illustrated embodiment.

In the upper right portion of the panel 80 are two rotary knobs 244 and 245. The knob 244 controls the multiple-position switch SR230, which is used in manual indexing of a comparator number at the beginning of a posting operation and under certain other circumstances. The knob 245 controls the multiple-position switch SR202, which may be set to any one of a plurality of positions to determine the number of account ledger cards which may be consecutively fed by the feeder 32 into the accounting machine 31 without a pick-up being made before the system is caused to lock.

In the lower right portion of the panel 80 are a series of six horizontally-aligned push buttons 246 to 251 inclusive. The push button 246 controls contacts SP271, which are operated when a manual setting of the hundreds order of a comparator number is to be made. The push button 247 controls contacts SP272, which are operated when a manual setting of the tens order of the comparator number is to be made. The push button 248 controls contacts SP273, which are operated when a manual setting of the units order of the comparator number is to be made. The push button 249 controls contacts SP274, which are operated when it is desired to take a manual new balance on the account being processed. The push button 250 controls the contacts SP245, which are operated when it is desired to make a manual read operation. The push button 251 controls the contacts SP283, which are operated when it is desired to make a manual card reset operation.

The manner in which the various switches and indicators described above and positioned on the control panel 80 cooperate in the operation and control of the present invention is explained in the description of the control circuitry, appearing subsequently.

*System Circuitry*

The circuitry which controls and coordinates the various components of the system of the present invention will now be explained. Only the circuitry relating to the tape-reading unit 33 and the manner in which it cooperates with and controls the accounting machine 31 and the feeder 32 will be described herein, since the circuitry relating to the accounting machine per se is described in the previously-cited United States Patent application Serial No. 610,754, and the circuitry relating to the feeder per se is fully described in the previously-cited United States patent application Serial No. 770,673. Where necessary to the understanding of the operation of the system as a whole, certain portions of the operating circuits of these two machines have been incorporated in the circuitry included in this application.

It is believed that the circuitry of the present invention may be described most clearly by expaining the manner in which this circuitry functions during certain operations of the system. Accordingly, it will be assumed at the beginning of this description that, as the system is approached for operation, power to the system is turned off, the various components are in "home" position, a stack of account ledger cards has been properly loaded into the feeder, and a corresponding reel of perforated tape has been properly positioned in the tape-reading unit for commencement of a posting operation by the system.

In order to initiate operation of the various operating circuits of the system, power must first be applied to the circuitry. This is accomplished by operation of the toggle switch 220, on the panel 80, which closes the contacts ST201. The power supply circuitry is not specifically shown herein, but it will be seen that, upon closing of the contacts ST201, power is supplied through conventional power supply components to the operating circuits shown in the various figures of the drawings. Also, an indicator lamp I206 (FIG. 18) is turned on when power is applied to the operating circuitry, illuminating the indicator 235 (FIG. 2).

Following application of power to the system by operation of the contacts ST201 through the toggle switch 220 on the reader panel 80, and before further action is taken to place the system into an operating condition, the relay K271 (FIG. 22A) is in a deenergized condition. This relay remains deenergized until it is energized by depression of the push button 226, which closes the contacts SP280A1 to energize said relay. The relay K271 controls a number of contacts in various portions of the system circuitry, and these will be described with reference to the functions which they perform when the relay K271 is in its initial deenergized condition.

The relay contacts K271AC11 (FIG. 13) prevent the comparator stepping switch coils SS231, SS232, and SS233 from being energized by any means except through the contacts SP271A1, SP272A1, and SP273A1, which are operated under control of the push buttons 246, 247, and 248, respectively, on the control panel 80.

The contacts K271BC11 (FIG. 15) close a circuit to the common of the manual comparator positioning switch SR230, allowing this switch to control positioning of the comparator stepping switches, in a manner which will subsequently be described.

The contacts K271A3 (FIG. 14) disable all of the key bank solenoids in the event of a parity failure or any other time that the relay K271 is deenergized, as in the instance being described, when the system has had power applied to it, without further action being taken.

The relay contacts K271AC2 (FIG. 22A) prevent the comparator selection relays K241, K242, and K243 from remaining energized when the relay K271 is deenergized.

The relay contacts K271BC2 (FIG. 22A) are closed to complete a circuit from a positive conductor 300 over the contacts K271BC2 and the relay K284 to a negative conductor 301 to energize the comparator indication relay K284, to cause illumination of the comparator number indication means. Energization of the relay K284 causes closing of the contacts K284A1, which completes a holding circuit over said contacts and the contacts K241BC11 to maintain the relay K284 in energized condition.

Energization of the relay K284 also closes the contacts K284A2 (FIG. 16) to apply power to the visual indicating means 376,377, and 378 to illuminate the comparator number appearing in the panel 243 in the control panel 80 (FIG. 2), as will be subsequently described in detail.

The relay contacts K271B1 (FIG. 18) are closed to complete a circuit for turning on a pilot light I205 to illuminate the indicator 239 to provide visual indication on the panel 80 (FIG. 2) of a parity failure.

The relay contacts K271A13 (FIG. 22A) prevent the clutch-operating coils L201 from energizing during a parity failure.

In order to commence reading operation of the system, the stepping switch SS201 (FIG. 14) must be in home position. This is accomplished by depressing the home stepper switch button 228 on the panel 80 in order to operate the contacts SP282A1 (FIG. 22C). Closing of the contacts SP282A1 completes a circuit between the plus conductor 300 and the minus conductor 301, to which a source of D.C. power is applied, over said contacts SP282A1, off-normal contacts 302, which are closed only when the stepping switch is not in home position, self-interrupter contacts 303, and the coil SS201M to energize said coil to drive its stepping switch to home position. It will be seen that the self-interrupter contacts 303 function to deenergize the coil SS201M momentarily at each time that it becomes energized to cause the stepping switch to step one step further. Then, as the coil SS201M deenergizes, the interrupter contacts 303 close once more to reenergize the coil SS201M. When the stepping switch reaches home position, the off-normal contacts 302 open to deenergize the coil SS201M and retain the stepping switch in its home position. A 100-ohm resistor 304 and a 0.5 microfarad capacitor 305 are placed in parallel to the series combination of switch contacts 302 and 303 in order to serve an arc-suppression function.

To commence feeding and tape-reading operations, the various orders of the comparator number must be manually indexed on the stepping switches SS231, SS232, and SS233. To set the hundreds order comparator switch SS231, the switch SR230 (FIG. 15) controlled by the knob 244 (FIG. 2) is set to the desired number, and the push button 246 (FIG. 2) controlling the contacts SP271A1 (FIG. 13) is depressed. Closing of the contacts SP271A1 (FIG. 13) completes a circuit from the positive conductor 306 through the contacts SP271A1, the normally-closed contacts K231BC1, the interrupter contacts 308 for the coil SS231M, and the coil SS231M to the negative conductor 307. A 100-ohm resistor 309, in series with a 0.5-microfarad capacitor 310, is placed in parallel to the series combination of the contacts K231BC11 and the contacts 308 to serve an arc-suppression function. The coil SS231M, in cooperation with the interrupter contacts 308, thereby causes the stepping switch SS231 to step from position to position. The switch SS231 will continue to advance step by step under control of its interrupter contacts 308 until the wiper of level "A" of the switch SS231 reaches a position corresponding to the position to which the multiple-position switch SR230 (FIG. 15) is set. As shown diagrammatically in FIG. 15, the "A" levels of the switches SS231, SS232, and SS233 have widened wipers, so that the wipers of the "A" level of these switches contact a contact on this level before the corresponding contacts on the other levels are reached, and so that each wiper on this level electrically engages a particular contact before the electrical connection between the wiper and the preceding contact has been broken. As the wiper of the "A" level of the switch SS231 reaches the contact corresponding to the contact to which the switch SR230 has been set, a circuit is completed from the positive conductor 315 of FIG. 15 over the contacts K271BC11, the switch SR230, the contact in the level "A" of switch SS231 corresponding to the "hot" contact of the switch SR230, a resistor 317, and the relay K231 to the negative conductor 316, to energize said relay K231. Energization of the relay causes the contacts K231BC1 (FIG. 13) to open, causing the coil SS231M of the switch SS231 to be deenergized, thus stopping the switch at the set position.

The remaining comparator stepping switches SS232 and SS233 may be manually set to the desired number for tens and units comparator numbers, respectively, by similar operations using the switch SR230 under control of the knob 244 and the contacts SP272 and SP273 under control of the push buttons 247 and 248 relating to tens and units comparator setting means, respectively.

It will be assumed that the last preceding operation on the accounting machine was a new balance or a new balance non-transfer operation. This means that the contacts SC20A1 (FIG. 22A) located in the accounting machine will be opened and will prevent the trip coils L201 from operating until a good pick-up has been made by the accounting machine even though all other conditions are set for commencement of operation.

The start reader button 226 (FIG. 2), controlling the contacts SP280A1 (FIG. 22A), is depressed, which energizes the relay K271 by completing the circuit from the positive conductor 300 over the contacts SP280A1 and the relay K271 to the negative conductor 301. Once energized, the relay K271 is held in energized condition over a circuit extending from the positive conductor 300 over the contacts K243BC12, K242B12, K241B12, and K271A12, and the relay K271 to the negative conductor 301. Also at this time, the accounting machine control switch 221, controlling the contacts ST250B2 (FIG. 22A), is placed in "auto" position. This closes the contacts ST250B2 (FIG. 22A) in the operating circuit for the coils L201 and places the accounting machine under control of the reader by positioning the contacts ST250C1 to the position shown in FIG. 19. At this time, the reader is ready to operate immediately following a balance pickup operation on the accounting machine.

Operation of the feeder is then initiated by depression of the appropriate control on its control panel. Initiation of this operation results in the feeding of a ledger card to the accounting machine and its subsequent checking by the accounting machine to determine whether or not the account number or control number of this card corresponds to the number which has been manually indexed into the switches SS231, SS232, and SS233. Failure of comparison in this instance causes the ledger card to be immediately ejected from the accounting machine.

When a ledger card bearing the correct account or control number is fed to the accounting machine, a pickup from said card is made by the accounting machine. During the pickup operation, the contacts SC20A1 in the accounting machine close, and, at the end of the pickup operation, the contacts SC945 in the accounting machine close, indicating to the reader that the accounting machine has completed a balance pickup operation. A circuit is thus completed to the reader trip coils L201 from the conductor 300 over the contacts SC20A1 (FIG. 22A), SC945, ST250B2, K271A13, K280B2, K251B11, K283B1, K250B11, SC212, SC250, SC209, and the coils L201 to the negative conductor 301. In the above circuit, the contacts SC209 and SC250 are interlocks relating to the condition of the paper tape. If a tape becomes too tight, the contacts SC250 open and prevent further tape advance. If the tape tears or runs out, the contacts SC209 open, preventing further reading.

The coils L201 control the reader clutch and allow the reader cam line to make one revolution when said coils are energized. As the reader cam line rotates, at 25 degrees of rotation, the contacts SC212 open to remove power from the coils L201. Since the clutch has been operated, however, the cam line will continue its rotation and complete a full revolution. Some time prior to 65 degrees of cam line revolution, the tape-sensing switches SC201 to SC205 inclusive (FIG. 17) are operated to sense the tape. At 65 degrees of cam line rotation, the contacts SC210 (FIG. 17) close.

It will be recalled that in the present embodiment, a two-of-five code is used on the tape. Therefore, in all character-sensing operations, in which a character is properly sensed from the tape by the reading unit, two of the sensing pins 109 will shift upwardly through apertures in the tape and will cause corresponding contacts from among the contacts SC201 to SC205 inclusive to close. As shown in FIG. 17, each of the contacts SC201 through SC205 inclusive is connected to a parallel combination of two relays, each of said relays being connected in series with a resistor. For example, the contacts SC201 are connected to a parallel combination including one series branch consisting of a resistor 296 and a relay K211, and also including another series branch consisting of a resistor 297 and a relay K201. The entire combination of contacts, resistors, and relays is connected between a positive conductor 295 and a negative conductor 298. Power is supplied to the positive conductor 295 over the previously mentioned cam-controlled contacts SC210. Let it be assumed, for example, that the sensing pins 109 have sensed information in the second and fourth channels of the tape. In such event, the contacts SC202 and SC204 are closed by movement of the corresponding sensing pins. Then, at 65 degrees rotation of the cam line, the contacts SC210 close, applying power to the positive conductor 295 and through the contacts SC202 and SC204 to energize the relays K202, K212, K204, and K214.

Each of the relays K211 to K215 inclusive controls a set of contacts K211A1 to K215A1, which perform a holding function to retain the previously-mentioned relays in energized condition. The contacts K211A1 to K215A1 are closed by energization of their corresponding relays. Then, at 180 degrees of revolution of the cam line, the contacts SC216, which are controlled by the cam line, close and complete the holding circuit for retaining the selected relays in energized condition until 325 degrees of rotation of the cam line.

Figure 20:
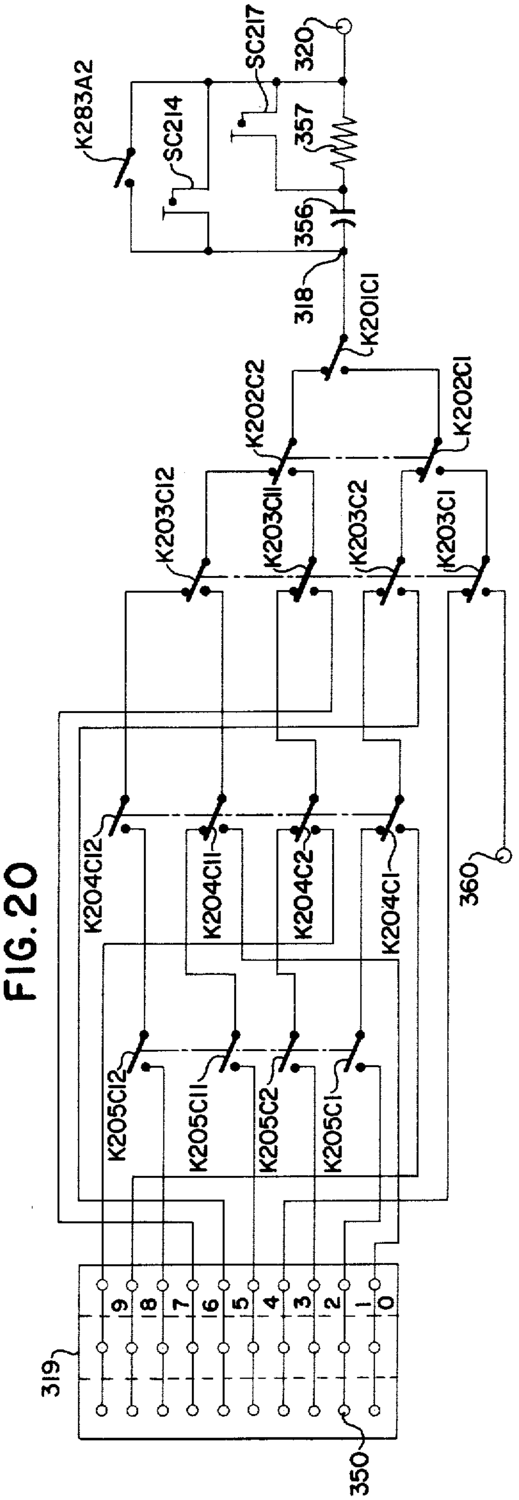

Now, referring to FIG. 20, it is seen that relay contacts controlled by the various relays K201 to K205 inclusive constitute a decoding network for translating the two-of-five code sensed from the tape into a decimal notation suitable for controlling the accounting machine. For example, with the relays K202 and K204 energized as described above, the relay contacts K202C1, K202C2, K204C1, K204C2, K204C11, and K204C12 are shifted from the positions in which they are shown in FIG. 20 to positions in which the blades of these contacts engage the lower of the two opposing terminals.

In such a case, a circuit path is completed from the point 318, over the contacts K201C1, K202C2, K203C11, and K204C2 to the bussed No. 9 terminals of the program board 319. This is the only path which is completed through the decoding network by the above combination of energized and deenergized relays K201 to K205 inclusive. Other combinations of these relays complete other paths to different terminals on the program board 319 of FIG. 20.

At 90 degrees of rotation of the cam line, the contacts SC214 (FIG. 20) close, completing a connection from the positive terminal 320 through the contacts SC214, the point 318, and the decoding relay contact path described above, to the program board 319, thus applying power to the terminals on this board corresponding to the decimal equivalent of the information sensed from the tape.

It will be recalled that the first information to be read from a frame of tape is comparator information, and it will also be recalled that at this time the multiple-level stepping switch SS201 is positioned in its #1 position, which is a comparator number position rather than an amount position. The power which was applied to the selected terminal on program board 319 in FIG. 20 is applied through the board 319 (also shown in FIG. 15) to the corresponding contacts on the "A" level of the stepping switches SS231, SS232, and SS233. If the wipers of any of the three stepping switches correspond in position to the "hot" terminal on the board 319, the associated stop relay K231, K232, or K233 will energize at this time.

Let it be assumed that the first order comparator switch has the same number stored therein by means of positioning of its wiper as the number of the terminal on the board 319 to which power is applied. The relay K231 then energizes at 90 degrees of cam line revolution, when the contacts SC214 close. Energization of the relay K231 causes the contacts K231BC1 (FIG. 13) to open, thereby preventing the coil SS231 (FIG. 13) from energizing. Also, the contacts K231AC1 (FIG. 13) close, to prepare a circuit which performs an answer-back function to check the position of the comparator stepping switch SS231.

Figure 22A:
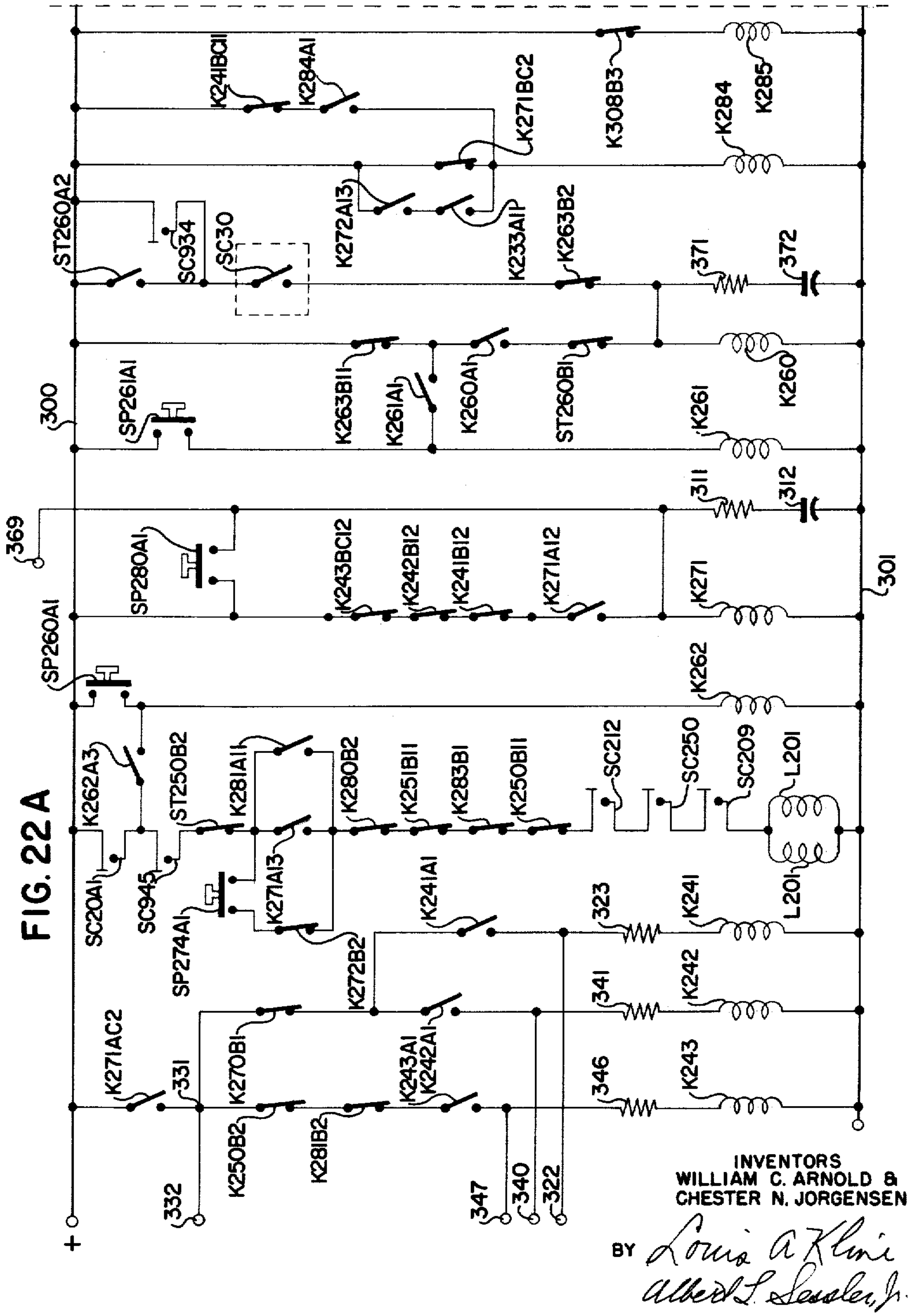

At 125 degrees of cam line rotation, the cam-controlled contacts SC215 (FIG. 14) close, which applies positive power from terminal 321 through the No. 1 position of level "L" of the stepping switch SS201 to the terminal 322 (FIGS. 14 and 22A), thus completing a circuit for energization of the relay K241 (FIG. 22A). Energization of the relay K241 causes the contacts K241A1 to close, thus completing a holding circuit for the relay K241 which extends from the positive conductor 300 through the contacts K271AC2 (which are closed except after parity failure), the contacts K270B1, the contacts K241A1, a resistor 323, and the relay K241 to the negative conductor 301.

Energization of the relay K241 also causes closing of the contacts K241A11 (FIG. 22B), which completes a circuit from the positive conductor 300 through said contacts and the relay K283 to the negative conductor 301, to energize said relay. The relay K283 prevents further reading of the tape until the first order of the comparator number has been sensed and checked.

The contacts K241BC11 (FIG. 22A) are caused to open by energization of the relay K241, thus interrupting the energizing circuit for the relay K284 and causing said relay to deenergize. This relay controls the comparator indication illumination and is effective to turn off the illumination during reading of comparator numbers, by its deenergization.

The contacts K241B12 (FIG. 22A) are open, thus interrupting the energizing circuit for the relay K271, which remains temporarily energized, however, due to operation of a time delay means which includes a series combination of a 100-ohm resistor 311 and a 180-microfarad capacitor 312 connected in parallel with the relay K271. The time delay means functions to maintain the relay K271 energized during a parity checking operation, so that if the parity check is correct, the energizing circuit for the relay K271 is reestablished, while if it is not correct, the relay K271 then deenergizes at the expiration of the time delay.

Figure 13:
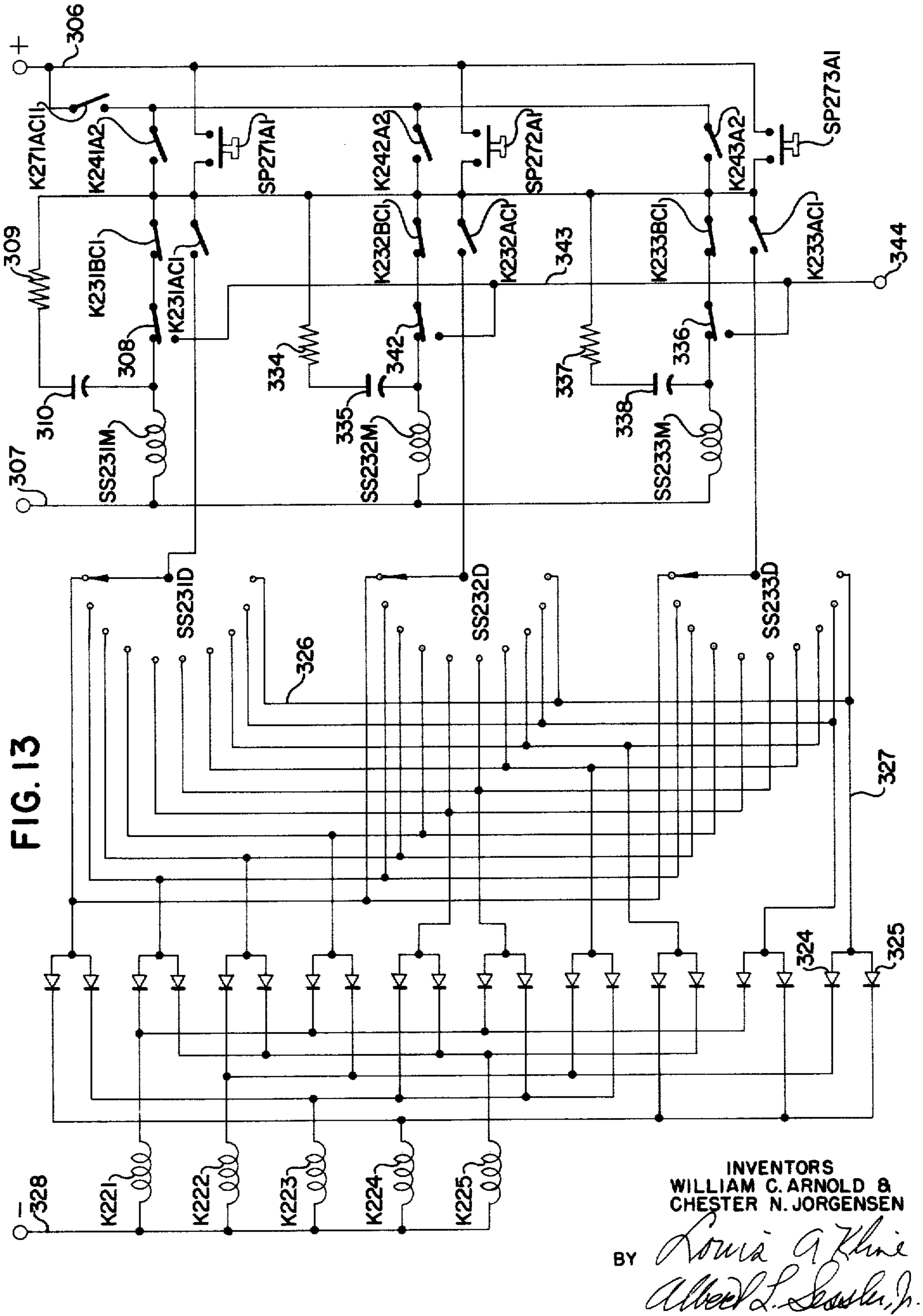

Energization of the relay K241 also closes the contacts K241A2 (FIG. 13). Closing of these contacts completes one of two different paths in FIG. 13, depending upon whether or not the relay K231 has previously been energized. In the event that the relay K231 (FIG. 15) has not previously been energized, the path completed by closing of the contacts K241A2 extends from the positive conductor 306 in FIG. 13 over the contacts K271AC11, K241A2, K231BC1, the interrupter contacts 308 and the coil SS231M to the negative conductor 307, to energize said coil and advance the switch SS231 step by step to the terminal on the "A" level of the switch SS231 to which power has been applied through the board 319, thereby completing an energizing circuit for the relay K231 to energize said relay, as previously described.

However, since it has been assumed in this description that the relay K231 has been energized prior to energization of the relay K241, the path completed by closing of the contacts K241A2 functions to read the parity check and answer-back circuit. This path is completed from the positive conductor 306 over the contacts K271AC11, K241A2, K231AC1, the wiper of the "D" level of the stepping switch SS231, the contact to which said wiper is positioned, the diodes, such as 324 and 325, which are connected by conductors such as 326 and 327 to the contact to which the wiper of the switch SS231 is positioned, and the relays K221 to K225 to which the diodes are connected, in this case K222 and K224, to the negative conductor 328.

Figure 21:
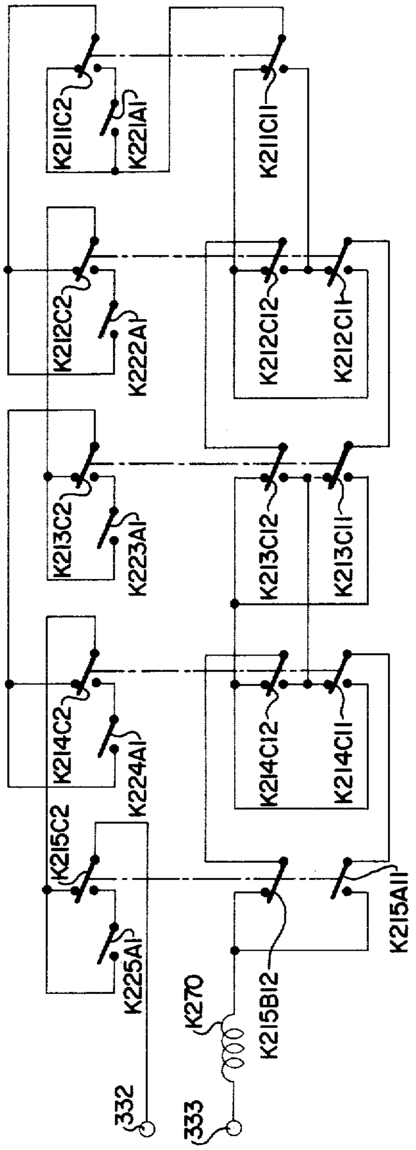

Energization of the proper ones of the relays K221 to K225 inclusive, stated in this example to be relays K222 and K224, causes operation of relay contacts related to these relays in the circuit of FIG. 21. In this circuit, then, with the relays K222 and K224 energized, the relay contacts K222A1 and K224A1 will be closed. Also in the circuit of FIG. 21, it will be realized that relay contacts corresponding to the relays K211 to K215 inclusive, which were energized at the same time as selected ones of the relays K201 to K205 inclusive, are operated. Thus, in this example, the relay contacts K212C2, K213C11, K212C12, K214C11, K214C12, and K214C2 are operated.

The purpose of the circuit of FIG. 21 is to perform a checking function to insure that the multiple-level wiper of the multiple-level switch SS231 is positioned corresponding to the number which has been read from the punched paper tape and caused to operate the appropriate decoding relays K201 to K205 inclusive. If a proper check is made, the relay K270 (FIG. 21) energizes, over a circuit which will be subsequently described, while if there is a failure of checking, the relay K270 does not energize.

Assuming in the example used herein that a proper check is made, the answer-back circuit will be completed from the conductor 300 (FIG. 22A) over the relay contacts K271AC2, the point 331, the terminal 332 (FIGS. 21 and 22A), the contacts K215C2, K214C2, K224A1, K213C2, K212C2, K222A1, K211C2, K211C11, K212C11, K213C11, K214C12, K215B12, the relay K270, and the negative terminal 333.

It will be seen that the circuit of FIG. 1 constitutes a checking circuit for even parity in which an even number of the coding relays K211 to K215 inclusive must be energized to complete the circuit, and in which contacts controlled by the answer-back relays K221 to K225 inclusive are also incorporated in series relationship to provide a dual check.

Energization of the relay K270 causes the contacts K270B1 (FIG. 22A) to open, thus breaking the holding circuit which maintains the relay K241 in energized condition. Deenergization of the relay K241 causes the contacts K241B12 (FIG. 22A) to close, thereby reenergizing the relay K271 before expiration of the time delay previously referred to, thus preventing a parity failure indication.

Deenergization of the relay K241 also causes the contacts K241A11 (FIG. 22B) to open, thereby deenergizing the relay K283 and allowing the next comparator number to be sensed from the tape. As mentioned previously, the relay K283 functions to prevent a succeeding reader cycle until the preceding comparator number has been read and verified.

Deenergization of the relay K283 causes the contacts K283B1 (FIG. 22A) to close, thereby closing the circuit to the trip coil L201 and permitting a further operation of the single-revolution clutch 175 to initiate the next reading cycle.

During the time that the relay K283 is energized, the relay contacts K283A2 (FIG. 20) by-pass the contacts SC214. This performs two functions. First of all, it insures that power is made available for energization of the relay K231 through the decoding network of FIG. 20, the program board 319, the appropriate contact of the "A" level of the switch SS231 (FIG. 15), and the resistor 317 until such time as the wiper of the switch SS231 is stepped to the appropriate contact, said power being maintained independently of the condition of the contacts SC214. Secondly, the closing of the contacts K283A2 to by-pass the contacts SC214 functions to hold the relay K231 in energized condition once said relay has been energized, independently of the condition of the contacts SC214.

Also during the time that the relay K283 is energized, the contacts K283A11 (FIG. 17) by-pass the contacts SC216 in order to maintain the decoding relays K201 to K205 inclusive and K211 to K215 inclusive, which are selected in accordance with the information sensed from the tape, in energized condition until positioning of the comparator stepping switch SS231 has been completed.

Also during the time that the relay K283 is energized, the contacts K283A12 (FIG. 22C) by-pass the contacts SC211 to maintain the main stepping switch coil SS201M in energized condition, thus preventing the stepping switch from advancing to its next position until the comparator stepping switch SS231 has been positioned and checked. When the relay K283 is deenergized, and the contacts K283A12 are open, the contacts SC211 cause the main stepping switch coil SS201M to energize at 105 degrees of rotation of the reader cam line and to deenergize at 320 degrees of rotation of said cam line to advance the stepping switch to its next position, the stepping switch SS201 being of the type which is advanced one position upon deenergization of its operating coil.

Upon deenergization of the relay K283, the relay contacts K283B1 (FIG. 22A) close, so that at 335 degrees of cam line rotation, the trip coils L201 (FIG. 22A) are energized by closing of the contacts SC212. The energization of the coils L201 starts reading of the second comparator number by the reader. The reading of this number follows the same procedure as described above for the reading of the first comparator number.

Let it be assumed, however, that in this case the number stored in the stepping switch SS232, corresponding to the "tens" order of the comparator number, does not agree with the number read from the tape. Then, when the contacts SC214 (FIG. 20) close at 90 degrees of cam line rotation, the relay K232 (FIG. 15), corresponding to the second order comparator number, will not energize. When the contacts SC215 (FIG. 14) subsequently close at 125 degrees of cam line rotation to energize the relay K242 (FIG. 22A), said relay is energized over a circuit extending from the positive terminal 321 (FIG. 14) over the contacts SC215, the No. 2 contact position of level "L" of the switch SS201, the terminal 340 (FIGS. 14 and 22A), the resistor 341, and the relay K242 to the negative conductor 301.

Energization of the relay K242 causes the contacts K242A11 (FIG. 22B) to close, completing a circuit from the positive conductor 300 through said contacts and the relay K283 to the negative conductor 301 to energize said relay, which prevents further reading of the tape until the "tens" order of the comparator number has been sensed and checked.

Energization of the relay K242 closes the contacts K242A1 (FIG. 22A) to complete a holding circuit for the relay K242 which extends from the positive conductor 300 over the relay contacts K271AC2, the point 331, the contacts K270B1, the contacts K242A1, the resistor 341, and the relay K242 to the negative conductor 301.

Energization of the relay K242 also causes the contacts K242A2 (FIG. 13) to close, completing an energizing circuit for the stepping switch coils SS232M which extends from the positive conductor 306 over the contacts K271AC11, K242A2, K232BC1, the interrupter contacts 342 for the coil SS232M, and the coil SS232M to the negative conductor 307. A 100-ohm resistor 334 in series with a 0.5-microfarad capacitor 335 is placed in parallel to the series combination of the contacts K232BC1 and the contacts 342 to serve an arc-suppression function.

The stepping switch SS232 advances under control of its interrupter contacts 342 until the shorting-type wiper on level "A" of the switch SS232 (FIG. 15) reaches the "hot" contact on that level of the stepping switch as selected through the decoding network of FIG. 20, according to the number read from the tape, in the manner previously described.

When the "hot" contact is engaged by the wiper of level "A" of the stepping switch SS232, the relay K232 (FIG. 15) energizes, thus opening the contacts K232BC1 (FIG. 13), which is effective to deenergize the stepping switch coil SS232M.

Energization of the relay K232 also causes the contacts K232AC1 (FIG. 13) to close, thus completing a circuit from the positive conductor 306 over the contacts K271AC11, K242A2, and K232AC1, the level "D" of the stepping switch SS232, and the diodes such as 324 and 325 connected to the contact to which the wiper of level "D" of the stepping switch 232 is positioned, to energize two of the relays K221 to K225 inclusive to set the parity check and answer-back network of FIG. 21 for operation in the manner described in connection with reading of the first comparator number.

During the time that the coil SS232M (FIG. 13) was energized for stepping of the stepping switch SS232 to the correct position, the interrupter contacts 342 applied a signal over the conductor 343 (FIG. 13), the terminal 344 (FIGS. 13 and 22B), the contacts SP271B2, SP272B2, SP273B2, the resistor 345, and the relay K282 to the negative conductor 301, to energize the relay K282 (FIG. 22B), which completed a holding circuit for itself by closing the contacts K282A1, said holding circuit extending from the positive conductor 300 over the contacts SC943, the contacts K282A1, a resistor 345, and the relay K282 to the negative conductor 301. The relay K282 may be similarly energized during stepping of the switches SS231 and SS233, and functions to provide indication that a new balance operation of the accounting machine is in order when said relay is energized. It will be seen that during a manual setting operation for setting comparator numbers in the switches SS231, SS232, and SS233, the energizing circuit for the relay K282 is interrupted by opening of one of the sets of contacts SP271B2, SP272B2, or SP273B2 under control of the push buttons 246, 247, or 248, respectively, on the panel 80.

Upon completion of reading of the second order of the comparator from the tape and the entry of this number into the proper components of the system, the reading of the third order of the comparator number may proceed.

The operations resulting from the reading of the third order of the comparator number are the same as those described for the first and second orders of the comparator numbers, depending upon whether the third order of the comparator number read from the tape is the same as the number which has been stored in the third order comparator stepping switch SS233, or whether it is different.

During reading of the third order comparator number, the relay K233 (FIG. 15) is energized in the manner previously described, closing the contacts K233A11 (FIG. 22A).

Also during the reading of the third order of the comparator number, the relay K243 (FIG. 22A) is energized over a circuit which extends from the positive terminal 321 (FIG. 14) over the contacts SC215, the No. 3 position of the "L" level of the stepping switch SS201, a terminal 347 (FIGS. 14 and 22A), a resistor 346, and the relay K243, to the negative conductor 301.

Energization of the relay K243 closes contacts K243A1 (FIG. 22A) to complete a holding circuit for maintaining the relay K243 in energized condition, said holding circuit extending from the positive conductor 300 over the contacts K271AC2, the point 331, the contacts K250B2, K281B2, K243A1, the resistor 346, and the relay K243 to the negative conductor 301.

Energization of the relay K243 also causes closing of the contacts K243A2 (FIG. 13). This completes one of two different paths in FIG. 13, depending upon whether or not the relay K233 has previously been energized, said paths being similar to those previously described in connection with relays K241 and K242. In the event that the relay K233 (FIG. 15) has not previously been energized, the path completed by closing of the contacts K243A2 extends from the positive conductor 306 in FIG. 13 over the contacts K271AC11, K243A2, K233BC1, the interrupter contacts 336, and the coil SS233M to energize said coil and advance the switch SS233. A 100-ohm resistor 337 in series with a 0.5-microfarad capacitor 338 is placed in parallel with the series combination of the contacts K233BC1 and the contacts 336, to serve an arc-suppression function.

The second alternative path which may be completed by closing of the contacts K243A2 extends from the positive conductor 306 over the contacts K271AC11, K243A2, K233AC1, the wiper of the "D" level of the stepping switch SS233, the contact to which said wiper is positioned, the diodes such as 324 and 325 which are connected by conductors such as 326 and 327 to the contact to which the wiper of the switch SS233 is positioned, and the relays K221 to K225 inclusive to which the diodes are connected, to the negative conductor 328. The selected relays are energized for operation of their respective contacts in the circuit of FIG. 21, which functions in the manner previously described.

Energization of the relay K243 also opens the contacts K243BC12 (FIG. 22A) to interrupt the energizing circuit for the relay K271 and commence the period of the previously-mentioned time delay for this relay.

In addition, energization of the relay K243 closes the contacts K243A11 (FIG. 22B) for energization of the relay K283 over a circuit which extends from the positive conductor 300 over the contacts K243A11 and the relay K283 to the negative conductor 301.

Figure 22B:
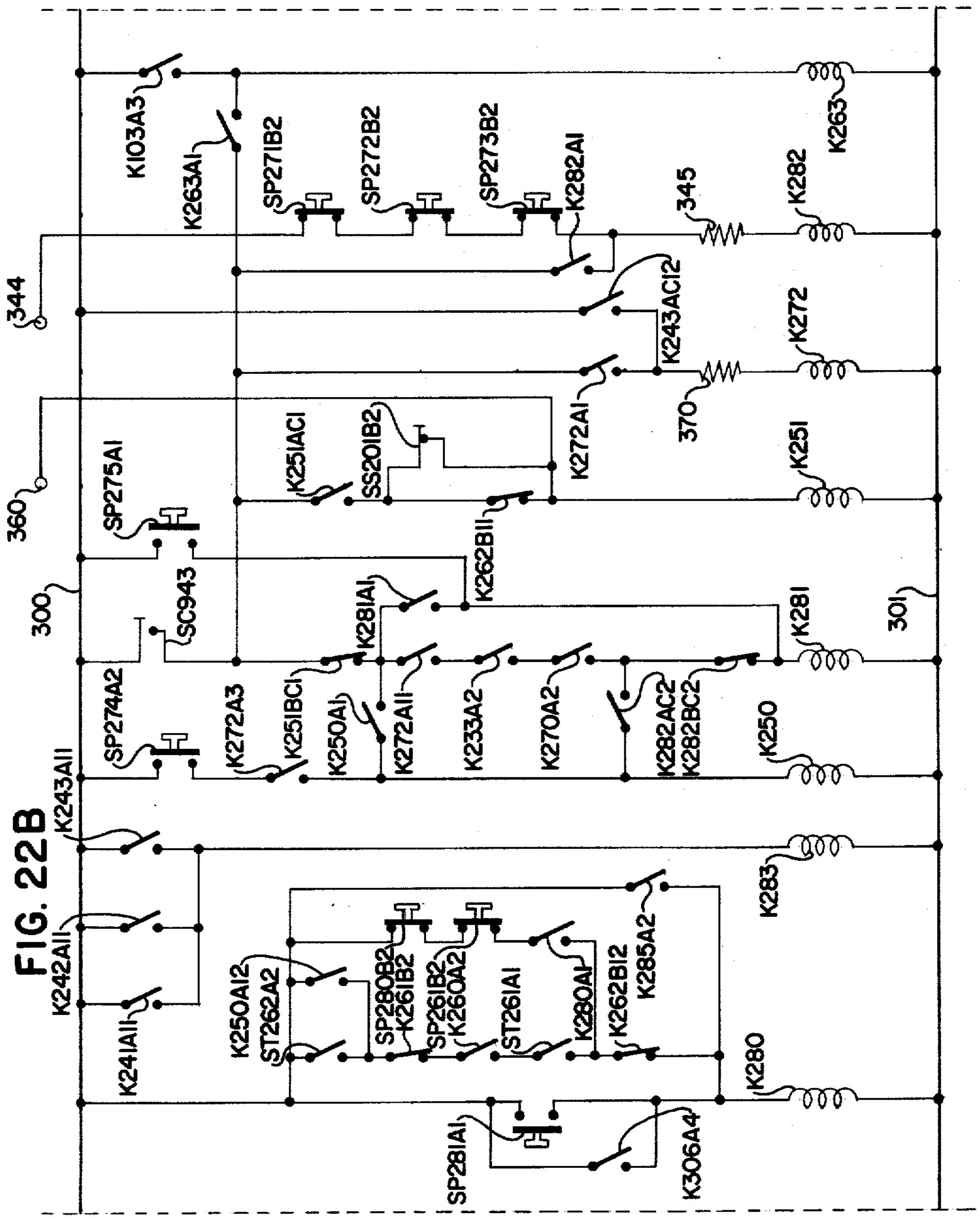
Figure 22C:
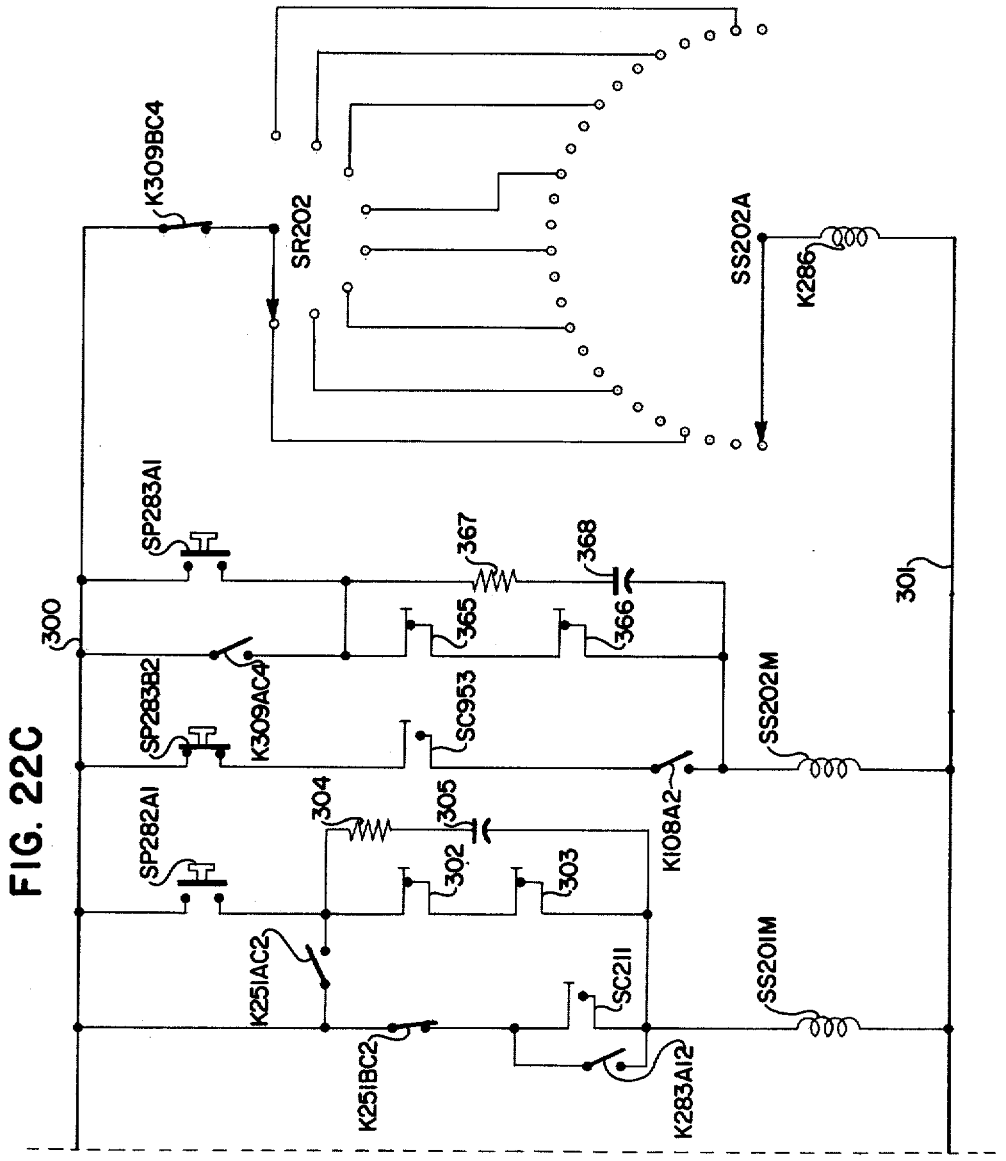

In addition, energization of the relay K243 causes closing of the contacts K243AC12 (FIG. 22B). Closing of these contacts is effective to energize the relay K272 (FIG. 22B) by means of a circuit which extends from the positive conductor 300 over the contacts K243AC12, a resistor 370, and the relay K272 to the negative conductor 301. Energization of the relay K272 causes closing of the contacts K272A1, which completes a holding circuit for the relay K272 which extends from the positive conductor 300 over the contacts SC943, the contacts K272A1, the resistor 370, and the relay K272 to the negative conductor 301. Energization of the relay K272 is also effective to close the contacts K272A13 (FIG. 22A), which, together with the contacts K233A11, closed by energization of the relay K233, are effective to complete an energizing circuit for the relay K284, said energizing circuit extending from the positive conductor 300 over the contacts K272A13, the contacts K233A11, and the relay K284 to the negative conductor 301.

Energization of the relay K284 closes the contacts K284A1 to complete a holding circuit for said relay which extends from the positive conductor 300 over the contacts K241BC11, the contacts K284A1 and the relay K284 to the negative conductor 301.

Energization of the relay K284 also closes the contacts K284A2 (FIG. 16), which completes a circuit extending from a positive terminal 375 over the contacts K284A2 and the "B" levels of the stepping switches SS231, SS232, and SS233, arranged in parallel combination, through visual indicator means 376, 377, and 378, associated with each of the "B" levels of the respective stepping switches, to a negative terminal 379. The voltage across the terminals 375 and 379 is 6.3 volts. The visual indicator means 376, 377, and 378 are of a well-known conventional type, and are so connected to the contacts of the "B" levels of their respective stepping switches SS231, SS232, and SS233 that they provide visual indication of the numbers corresponding to the contacts to which the wipers of the respective stepping switches are set.

It will be recalled that in the reading of the first two orders of the comparator number, energization of the relay K270 (FIG. 21) caused the opening of the contacts K270B1( FIG. 22A) to deenergize the relay K241 or K242 at the proper time, thus permitting the reading of the succeeding order of the comparator number. In the case of reading of the third order of the comparator number, the energization of the relay K270 (FIG. 21) is effective to close the relay contacts K270A2 (FIG. 22B). In the event that the relay K282 has previously been energized during stepping of one of the switches SS231, SS232, or SS233, thus indicating reading of a different comparator number from that which was stored, the contacts K282AC2 (FIG. 22B) are closed. In such case, closing of the contacts K270A2 completes a circuit from the positive conductor 300 over the contacts SC943, K251BC1, K272A11, K233A2, K270A2, K282AC2, and the relay K250 to the negative conductor 301, to energize the relay K250.

Energization of the relay K250 closes contacts K250A1 (FIG. 22B) to complete a holding circuit which extends from the positive conductor 300 over the contacts SC943, the contacts K251BC1, the contacts K250A1, and the relay K250 to the negative conductor 301 to maintain the relay K250 in energized condition. Energization of the relay K250 also closes the contacts K250A13 (FIG. 19) in a control circuit in the accounting machine which is effective in proper circumstances to cause said accounting machine to make a new balance operation.

In addition, energization of the relay K250 opens the relay contacts K250B2 (FIG. 22A), which breaks the holding circuit for maintaining the relay K243 in energized condition.

Deenergization of the relay K243 causes the contacts K243A11 (FIG. 22B) to open, thereby deenergizing the relay K283. This closes the contacts K283B1 (FIG. 22A) in the circuit for the reader trip coils L201 to prepare the reader for reading the remainder of the information on the frame being read, following the next balance pick-up operation of the accounting machine in picking up a new account card having an account number corresponding to the account number read from the tape.

Further reading of the tape, until the next correct pick-up of information from a ledger card has taken place, is prevented by means of switch contacts SC20A1 (FIG. 22A) in the energizing circuit for the reader trip coils L201. These contacts open during a new balance operation and remain open until the next pickup operation.

In the event that the comparator number read from the tape is the same as the comparator number stored in the stepping switches SS231, SS232, and SS233, the reley K282 (FIG. 22B) has not been energized during reading of the comparator number from the tape. Then, when the relay K270 energizes, closing of a contacts K270A2 (FIG. 22B) completes a circuit which extends from the positive conductor 300 over the contacts SC943, K251BC1, K272A11, K233A2, K270A2, K282BC2, and the relay K281 to the negative conductor 301, to energize said relay. The energization of the relay K281 opens the contacts K281B2 (FIG. 22A), thereby deenergizing the relay K243. This, in turn, causes opening of the contacts K243A11 (FIG. 22B) to deenergize the relay K283, in the manner previously described. The contacts K283B1 (FIG. 22A) then close, which permits the tripping coils L201 to energize so that the reader 33 may immediately read the remainder of the frame of information on the tape.

Energization of the relay K281 also closes the contacts K281A1 (FIG. 22B) to complete a holding circuit which extends from the positive conductor 300 over the contacts SC943, K251BC1, K281A1, and the relay K281 to the negative conductor 301 to maintain said relay K281 in energized condition.

At this time, the reader is conditioned to read the remainder of the information carried on the first frame of the tape either at once, or following the next balance pick-up operation from the ledger card, depending upon whether a new balance operation or a continue-to-read operation has been called for by comparison of the comparator number read from the tape with the comparator number stored in the comparator number switches SS231, SS232, and SS233. In this case, it will be assumed that a continue-to-read operation is called for, signifying that the comparator number read from the control card by the operator and manually indexed into the comparator number switches SS231, SS232, and SS233 agrees with the control number in the tape.

It will be recalled that the remainder of the information in this first frame on the tape is spurious information, serving only to complete the cycling of the system back to a home position, and serving no purpose so far as account posting is concerned. The first cycle of the tape reader cam line will cause a character corresponding to the transaction information to be read from the tape, this cycle being initiated by closing of the contacts SC212 (FIG. 22A) at 335 degrees. As in reading the comparator numbers, the information on the tape is sent by the sensing switches SC201 to SC205 inclusive to the coding relays K201 to K205 inclusive at 65 degrees of rotation of the cam line, when the contacts SC210 close. During this cycle, however, the main stepping switch SS201 is in a position to effect energization of a solenoid to operate a key in the control row, row 2, of the accounting machine 31. At 90 degrees of rotation of the cam line, the contacts SC214 (FIG. 20) close to complete an energizing circuit for the selected solenoid, in the manner to be described below.

Figure 14:
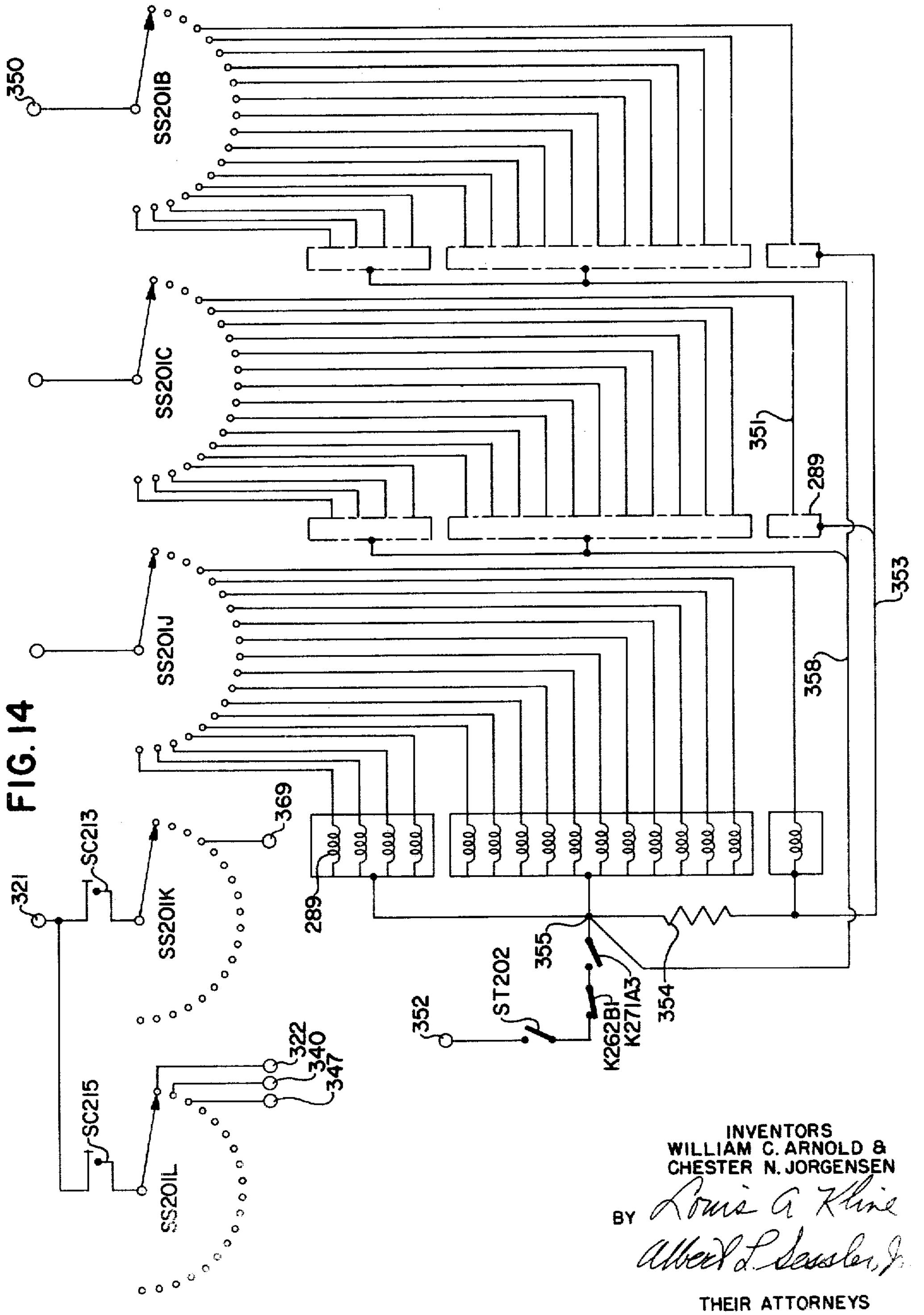
Figure 15:
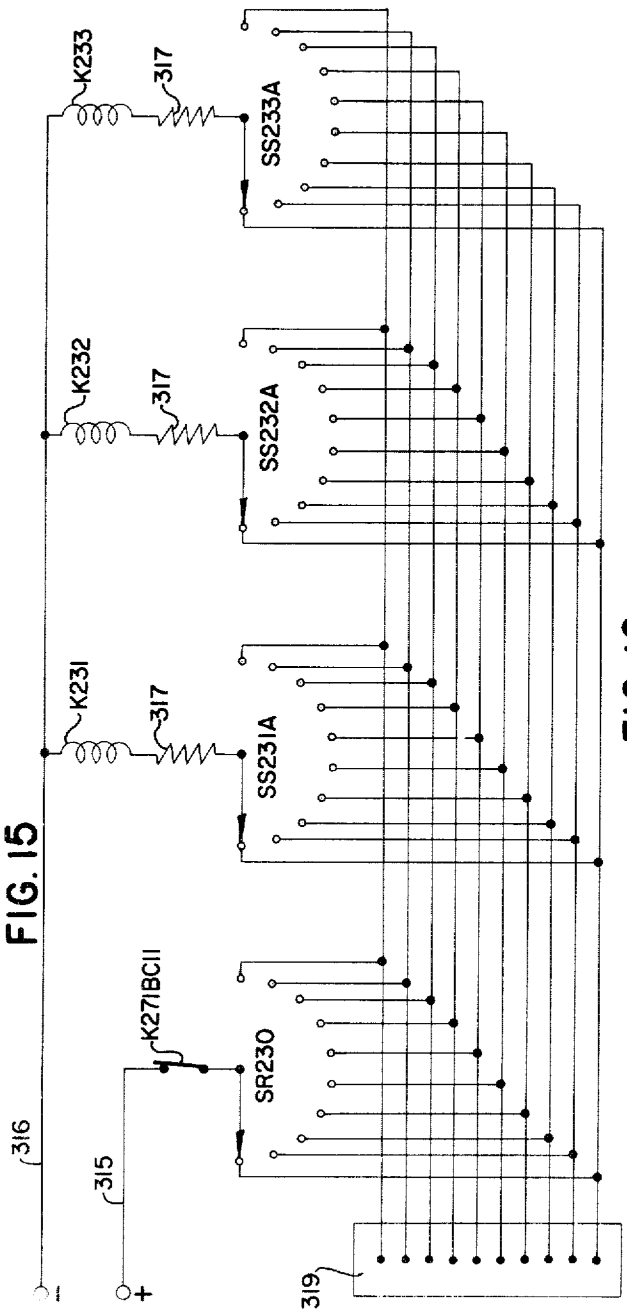
Figure 16:
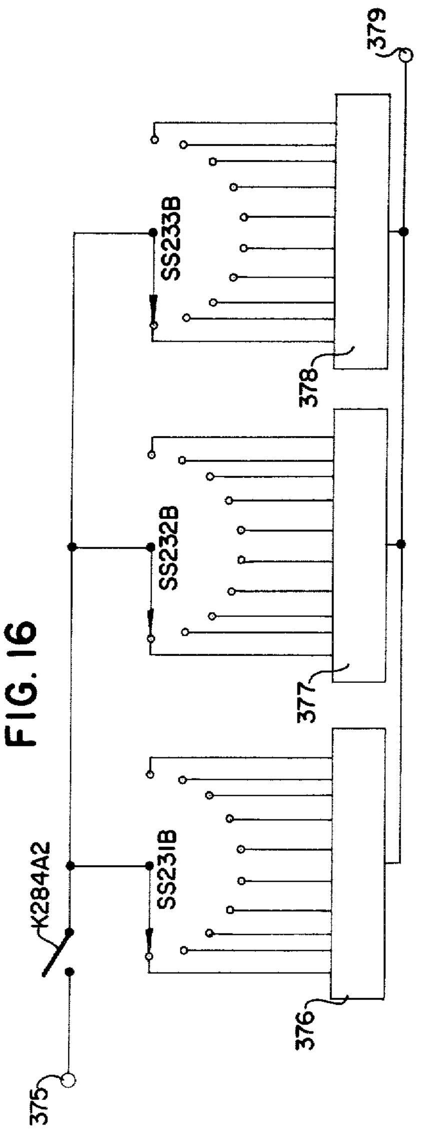

As shown in FIG. 14, the main stepping switch SS201 comprises a plurality of levels, each level having a number of contacts and a wiper which is stepped successively from one contact to the next. The wipers of all of the various levels are connected together for unitary movement and are operated by energization and deenergization of the coil SS201M of the switch SS201 in a well-known manner, the energization of said coil cocking the wiper-operating mechanism, and the subsequent deenergization of said coil releasing the wiper for movement to the next contact position. One of the stepping switch levels B to J inclusive is provided for each number 1 through 9 corresponding to the various positions within each bank of the accounting machine keyboard. In addition, special levels K and L are provided, which exert certain special controls, to be subsequently described.

In the illustrated embodiment of the invention, level A of the switch SS201 is not used. The levels SS201B, SS201C, and SS201J (FIG. 14) correspond to the numerical positions 1, 2, and 9, respectively. Stepping switch levels D through I of the stepping switch SS201, corresponding to the numerical positions 3 through 8 inclusive, are not shown in FIG. 14, but are the same in construction as the levels B, C, and J, which are shown.

As diagrammatically shown in FIG. 14, each contact position of each level SS201B to SS201J inclusive of the stepping switch SS201 is connected to an individual solenoid 289, which is positioned over a key on the accounting machine keyboard in the manner shown in FIGS. 9 and 10 and previously described. All of the solenoids connected to each level of the stepping switch SS201 represent the same numerical value in the different banks of the keyboard. For example, each solenoid connected to the various contact positions of the "B" level of the stepping switch SS201 is positioned over a No. 1 key in the various banks of the accounting machine keyboard, while each solenoid connected to the various contact positions of the "J" level of the stepping switch SS201 is positioned over a No. 9 key of the various banks of the accounting machine keyboard.

The wipers of the various levels of the stepping switch SS201 are connected over conductors to terminals corresponding to the numerical value of their respective solenoids in the program board 319 (FIG. 20). For example, the wiper of the level SS201B is connected to a terminal 350 (FIGS. 14 and 20) in the program board 319.

Now let it be assumed that the wipers of the various levels of the main stepping switch SS201 are in position 4, engaging the corresponding contacts of the various levels of the stepping switch, and that position 4 is connected, in these levels, to the solenoids controlling the keys of the control row, row 2 of the accounting machine keyboard. Let it also be assumed that perforations corresponding to the number 2 have been read from the tape. In such a case, the key bank solenoid 289 over the No. 2 key in the transaction row 2 is energized through the following circuit. The contacts SC214 (FIG. 20) close at 90 degrees of rotation of the reader cam line and apply power from the positive terminal 320 to the decoding network of FIG. 20. According to the code used in the illustrated embodiment, the sensing switches SC202 and SC205 are closed, thus causing the relays K202 and K205 to be energized, and their contacts to be operated. A circuit to the No. 2 terminal of the program board 319 is then completed from the terminal 320 through the contacts SC214, K201C1, K202C2, K203C11, K204C2, and K205C2. Power applied to the No. 2 terminal of the program board 319 is transmitted through the wiper of level C of the stepping switch SS201 to the No. 4 contact of said level, to which the wiper is positioned, and thence over a conductor 351 to the solenoid 289 positioned over the No. 2 key in row 2 in the accounting machine keyboard. A return from the selected solenoid 289 to the minus power terminal 352 follows a path through a common return conductor 353, a resistor 354, a point 355, the contacts K271A3, which are closed except following a parity failure, the contacts K262B1, which are closed unless a skip-tape operation is being performed, and the contacts ST202, which are used to prevent solenoids from energizing during testing. The selected solenoid 289 is thus energized and remains energized until the contacts SC214 (FIG. 20) open at 305 degrees.

The inductive surge caused by opening of the contacts SC214 is limited by a capacitor 356, which is placed in series combination with the cam-controlled contacts SC217, directly across the contacts SC214. A resistor 357 is placed in parallel with the contacts SC217. When the contacts SC214 close at 90 degrees, the contacts SC217 are open, thus placing the resistor 357 in series with the capacitor 356 across the contacts SC214, and preventing a large surge of current through the contacts SC214, which would otherwise be caused by discharge of the capacitor 356.

Succeeding rotations of the reader cam line cause the stepping switch SS201 to advance through further positions in the manner previously described. In each position, the number read from the tape by the sensing switches SC201 to SC205 inclusive, and set up in the decoding relay network of FIG. 20, is transmitted through the program board 319, by closing of the contacts SC214, to the wiper of one of the levels of the stepping switch SS201, and from there to the selected solenoid 289 controlling one of the keys in the amount rows of the accounting machine keyboard. The energizing circuit for the solenoids 289 controlling the amount rows is similar to that described for energizing the solenoids of the transaction row 2. For energizing an amount solenoid, the energizing circuit extends through the common of the selected level of the stepping switch, the wiper of said common and the contact to which said wiper is positioned, the selected solenoid, a conductor 358, the point 355, the contacts K271A3, the contacts K262B1, and the contacts ST202 to the negative terminal 352. It will be seen that the commons of all of the solenoids for the amount and check count portions of the accounting machine keyboard are tied together and follow the path described above, which is the same path as that used for the transaction row 2 solenoids, except that no resistor is in series with the solenoids. The resistor 354 is placed in series with the solenoids used for controlling the transaction row 2, due to the greater force required to operate these solenoids.

The last information to be read from each frame on the tape is a trip symbol. In the illustrated embodiment, this trip symbol, as shown in FIG. 11, comprises perforations in the first, second, and third channels of the tape. Consequently, sensing of this symbol causes the sensing switches SC201, SC202, and SC203 to close, thereby energizing the relays K201, K202, and K203, and operating contacts controlled by these relays. Then, when the contacts SC214 (FIG. 20) close at 90 degrees of cam line rotation, a circuit is completed from the terminal 320 over the contacts SC214, the point 318, the contacts K201C1, the contacts K202C1, the contacts K203C1, a terminal 360 (FIGS. 20 and 22B), and the relay K251, to the negative conductor 301, to energize said relay K251. Energization of the relay K251 closes the contacts K251AC1 (FIG. 22B) to complete the holding circuit for said relay which extends from the positive conductor 300 over the contacts SC943, contacts K251AC1, contacts K262B11, or contacts SS201B2, which are in parallel to the contacts K262B11, and the relay K251 to the negative conductor 301.

The contacts K251B11 (FIG. 22A) interrupt the energizing circuit for the reader trip coils L201, to stop cycling of the reader at this point.

The contacts K251A12 (FIG. 19) close to complete an energizing circuit for an operating relay in the accounting machine to cause said accounting machine to cycle for an operation, under proper conditions of operation.

The contacts K251AC2 (FIG. 22C) are closed by energization of the relay K251 to complete an energizing circuit for the coil SS201M which extends from the positive conductor 300 over the contacts K251AC2, the "off normal" contacts 302, the "interrupter" contacts 303, and the coil SS201M to the negative conductor 301 to energize said coil. This circuit is effective to step the stepping switch SS201 to home position, at which time the "off normal" contacts 302 open and the circuit is interrupted to maintain the stepping switch SS201 in its home position. At the same time that the contacts K251AC2 closed, the contacts K251BC2 opened to interrupt another branch of the energizing circuit for the coil SS201M.

As the accounting machine commences its cycle of operation, the contacts SC945 (FIG. 22A) open at 15 degrees of the accounting machine cycle, thus interrupting the energizing circuit for the trip coils L201 of the reader, to prevent any operation of the reader during the operation of the accounting machine. At 250 degrees of accounting machine cycle of operation, the contacts SC943 (FIG. 22B) open, thus interrupting the energizing circuit for the relay K251 by opening its holding circuit. Deenergization of the relay K251 causes the contacts K251B11 (FIG 22A) in the energizing circuit for the coils L201 to close once more, thus conditioning this energizing circuit for operation when the contacts SC945 close again at 350 degrees of the accounting machine cycle of operation.

At this time, reading of the first frame of information from the tape by the reading unit 33 is completed, and a transaction record is printed on the control card by the accounting machine. The account number forming part of the next frame of information on the tape is now read from the tape in the manner previously described, and, in the example being presented here, will cause a new balance operation of the accounting machine, since it will be the account number corresponding to the first ledger card of those stacked in the feeder 32 on which a check or deposit entry is to be made. The control card formerly atop the stack will be ejected from the accounting machine 31 following the new balance operation, and any ledger card located in the stack above the ledger card pertaining to the account on which the first posting is to be made, according to information contained on the first account-information, bearing frame on the tape, will be rejected by the accounting machine due to a failure of comparison of the account numbers with the account number read from the tape by the reading unit 33.

During the new balance operation preceding ejection of the control card, the contacts SC20A1 (FIG. 22A), which are physically located in the accounting machine, open at 100 degrees of the cycle of operation of the accounting machine, and remain open in order to prevent the reader trip coils L201 (FIG. 22A) from operating following the new balance operation. Also during the new balance operation, the contacts SC943 (FIG 22B) open at 250 degrees of the cycle of accounting machine operation, thus deenergizing the new balance trip relay K250, which, it will be recalled, was energized in order to initiate a new balance operation of the accounting machine.

Upon completion of the new balance operation by the according machine, a signal is transmitted from the accounting machine 31 to the card feeder 32, which is effective to cause the feeder to commence sending account cards into the accounting machine. Under normal circumstances, cards are fed from the feeder to the accounting machine until a card is fed having an account number magnetically stored thereon which agrees with the account number which has been prevoiusly read from the tape and stored in the stepping switches SS231, SS232, and SS233, in the manner previously described. The manner in which this comparison of tape-stored information and card-stored information is effected will now be described.

Figure 12:
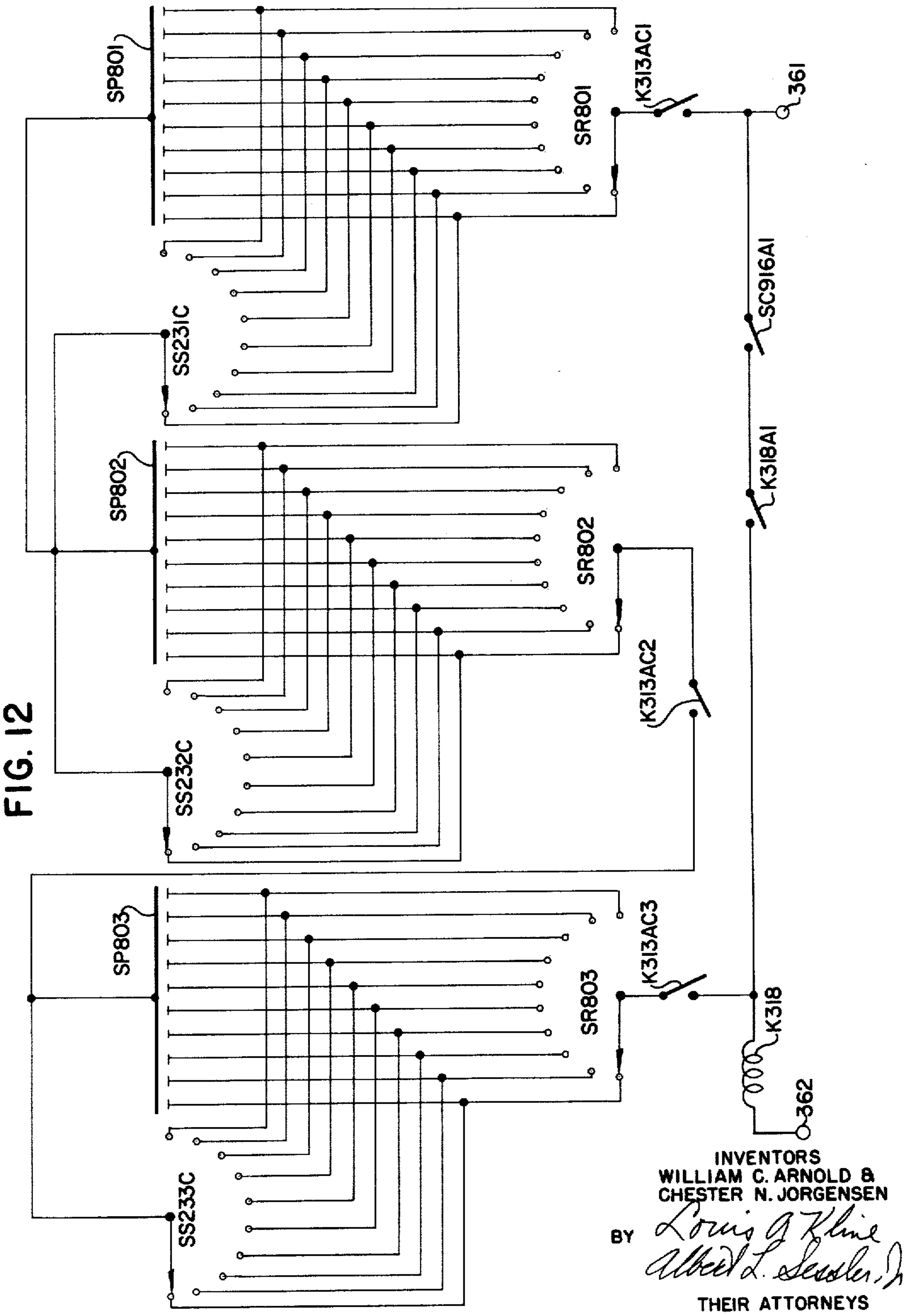

As the comparator numbers were sequentially read from the tape by the tape reader 75, the stepping switches SS231, SS232, and SS233, representing the hundreds, tens, and units orders of the comparator number, respectively, were positioned to locations representing the various digits read. The "C" level of each of the stepping switches SS231, SS232 and SS233 is used in performance of the function of comparison of the information read from the tape with the information sensed from the ledger card by the accounting machine. These switch levels are shown in FIG. 12 and are designated SS231C, SS232C, and SS233C, respectively. In a manual posting operation, as has been previously described in the above-cited United States patent application Serial No. 610,754, the comparator number or account number from the various checks and deposits is set into the comparator circuit of FIG. 12 by depression of appropriate keys in the comparator keyboard of the accounting machine, thus effecting closure of corresponding contacts of the switches SP801, SP802, and SP803. In the present embodiment, in which check and deposit input information, as well as comparator number information, is automatically read from a perforated paper tape and entered into the accounting machine, the manually operable switches controlled by the comparator keyboard must all be in open position. As shown in FIG. 12, the previously mentioned stepping switch levels SS231C, SS232C, and SS233C are connected in parallel with the corresponding manually operated switches SP801, SP802, and SP803. The position of the wiper of each of the switch levels SS231C, SS232C, and SS233C indicates the digit of the various orders of the account number read from the tape, and with which the account number of the selected card is compared.

The switches SR801, SR802, and SR803, shown in FIG. 12, are contained in the accounting machine and are positioned according to the comparator number read from the ledger card fed to the accounting machine. Also at this time, a relay located in the accounting machine is energized, thereby closing the contacts K313AC1, K313AC2, and K313AC3 (FIG. 12).

It will therefore be seen that when the number set into the three rotary switches SR801, SR802, and SR803, in the accounting machine, corresponds to the number set in the three switches SS231C, SS232C, and SS233C, a circuit is completed between the terminals 361 and 362, to which a source of A.C. power of 110 volts is applied, over the contacts K313AC1, the contact of the switch SR801 to which its wiper is positioned, the contact of the switch SS231C to which its wiper is positioned, the contact of the switch SS232C to which its wiper is positioned, the contact of the switch SR802 to which its wiper is positioned, the contacts K313AC2, the contact of the switch SS233C to which its wiper is positioned, the contact of the switch SR803 to which its wiper is positioned, the contacts K313AC3, and the relay K318. This energizes the relay K318, which is effective to cause the accounting machine to accept, for a posting operation, the ledger card on which the comparator number was stored. Once the relay K318 energizes, it is held in through contacts K318A1 and the contacts SC916A1, which are controlled in the accounting machine.

On the succeeding new balance operation, the relay K318 is deenergized by opening of the contacts SC916A1, thus preparing the comparator circuit for the next account card.

It will be seen that if any order of the comparator number read from the tape and stored in the switches SS231, SS232, and SS233 does not correspond to the number of the corresponding order of the comparator number sensed from the ledger card and stored in the switches SR801, SR802, and SR803, the series circuit described above will not be completed, and the relay K318 will not be energized. Consequently that ledger card will be ejected from the accounting machine, and the next ledger card will be fed to the machine from the feeder 32, at which time another account number comparison will be made.

In order to guard against malfunction of the system due to a misfiled or missing account card, a card search limit circuit has been devised. Let it be assumed that a card, the account number of which does not compare to the account number being read, also termed an inactive card, is entering the accounting machine. The failure of comparison of the account number on this card with the account number stored in the comparison storage switches will cause a relay in the accounting machine to remain in an unenergized condition. This relay controls the contacts K309AC4 and K309BC4, and, since the relay remains unenergized, the relay contacts K309AC4 remain open and the contacts K309BC4 remain closed. In addition, the fact that the account card is "inactive" causes a relay in the card feeder 32 to operate, thereby closing the contacts K108A2, controlled by said relay.

Therefore, as an "inactive" account card enters the accounting machine 31, a circuit is completed from the positive conductor 300 over the contacts SP283B2 (FIG. 22C), which are controlled by the push button 251 on the control panel 80, the contacts SC953, which are controlled by the accounting machine and closed from 170 to 190 degrees of the cycle of accounting machine operation, the contacts K108A2, and the coil SS202M for the stepping switch SS202 to the negative conductor 301. This energizes the coil SS202M for a short period and then deenergizes it, as the contacts SC953 open. The energization and subsequent deenergization of the coil SS202M cause the stepping switch SS202 to advance one position. Said switch advances one position for each "inactive" card that passes into and is ejected from the accounting machine 31.

A switch SR202 (FIG. 22C), known as the card search limit switch, is controlled by the knob 245 on the control panel 80 and can be preset to any desired numerical position, in multiples of three in the illustrated embodiment, to control the number of inactive cards to be permitted to pass through the accounting machine 31 before a lock-up of the system occurs. Let it be assumed that the switch SR202 has been set to position 3. Then, when the stepping switch SS202 has been advanced to its position 3 by virtue of three inactive account cards having passed through the accounting machine, the wiper of level "A" (FIG. 22C) of the stepping switch SS202 is positioned to its third contact position. This completes a circuit from the positive conductor 300 over the contacts K309BC4, the switch SR202, set to its No. 3 position, the No. 3 contact of the "A" level of switch SS202, the wiper of said level, and a relay K286, known as the card search relay, to the negative conductor 301. Completion of the above circuit energizes the relay K286 and causes the contacts K286B1 (FIG. 19) to open. The circuit shown fragmentarily in FIG. 19 containing the contacts K286B1 forms a part of the operating circuitry for the card feeder 32 and is effective, upon opening of the contacts K286B1, to block the card feeder from further operation.

Energization of the relay K286 also closes the contacts K286A2 (FIG. 18), completing a circuit which applies power to a pilot light I203, turning on said light to illuminate the indicator 240 on the panel 80 (FIG. 2), thus informing the operator of a search failure condition.

When the cause of the malfunction which led to locking up of the system has been corrected, and it is desired to commence the automatic feeding of cards once more, the push button 251 on the control panel 80 is depressed. This closes the contacts SP283A1 (FIG. 22C), which completes a circuit from the positive conductor 300 over the contacts SP283A1, the "off normal" contacts 365, which are closed except when the stepping switch SS202 is in home position, the "self interrupter" contacts 366, and the coil SS202M to the negative conductor 301 to energize said coil. A resistor 367 and a capacitor 368 are connected in series combination in parallel with the contacts 365 and 366 and serve an arc-suppression function.

Energization of the coil SS202M over the circuit described above causes said coil to step the stepping switch SS202, in a step-by-step manner, to its home position, at which time the "off normal" contacts 365 open to interrupt the circuit and maintain the switch SS202 in home position.

It will be seen that return of the stepping switch SS202 to its home position causes the wiper of level "A" of said switch to be positioned in home position, thereby breaking the circuit to relay K286 and deenergizing said relay. This is effective to cause the relay contacts K286B1 (FIG. 19) to close and thereby permit the card feeder 32 to commence operation once more in a normal manner.

If, after one or two "inactive" cards have passed through the accounting machine 31, a card having a comparator number which compares properly with the number stored in the comparator storage switches arrives, the stepping switch SS202 is automatically returned to its home position from the position to which it had been set by the "inactive" cards preceding. When an "active" card, having a comparator number which compares properly with the number stored in the comparator number storage switches, is fed into the accounting machine, the relay located in the accounting machine which controls the contacts K309AC4 and K309BC4 is operated, while the relay located in the feeder which controls the contacts K108A2 will not operate. Therefore the energizing circuit for the coil SS202M (FIG. 22C) which extends through the contacts SC953 is blocked due to the opening of the contacts K108A2, and a new circuit is completed through the contacts K309AC4, the "off normal" contacts 365, and the "interrupter" contacts 366, to energize the coil SS202M to cause the stepping switch SS202 to return to home position in the manner previously described. During this operation, the contacts K309BC4 open to prevent the relay K286 from being momentarily energized while the stepping switch SS202 returns to its home position.

Now, let it be assumed that an account card having thereon a comparator number which is the same as the number stored in the comparator storage switches is fed into the accounting machine. A balance pickup operation is then made by the accounting machine. At this time, the remainder of the information contained in the frame on the perforated tape is read, including the transaction information, the amount information, and a trip symbol. An impulse produced by reading of the trip symbol energizes the relay K251 (FIG. 22B) in the manner previously described, and causes the accounting machine to again cycle for a check or deposit operation. Following this cycle, the reading unit 33 commences reading of the next frame of information on the tape, the first part of which is the account number for the following items.

Let it be assumed that, as the first comparator number is read, the comparator storage switch SS231 for some reason is not positioned to its correct location. In such a case, the answer-back circuitry of FIG. 21 will not energize the relay K270 in the manner previously described. If the relay K270 does not operate, then the contacts K270B1 (FIG. 22A) remain closed, thus maintaining the relay K241 in energized condition. This, in turn, maintains the contacts K241B12 (FIG. 22A) in the open position, which after a time delay of approximately one-half second, caused by the resistor 311 and the capacitor 312, will cause the relay K271 to deenergize. After the parity failure relay K271 is deenergized, it can only be reset by operating the reader-start button 226 on the panel 80 (FIG. 2) to close the contacts SP280A1 (FIG. 22A).

The contacts controlled by the relay K271 are now in the positions previously described at that point in the description when the tape reader was initially turned on. At this point, the machine operator must determine what comparator number to set up on the machine.

When the stack of ledger cards and the perforated tape pertaining to a certain group of accounts are initially brought to the accounting system for posting, a container holding all of the individual checks and deposit slips for which information appears on the tape is customarily included. In the case of a parity failure such as that described above, the operator determines from the container of items which came with the tape what the comparator number is that the reader was attempting to read at the time of failure. This is accomplished by visual inspection of the checks and deposit slips and the journal sheet contained in the accounting machine. When the proper comparator number is found, it is indexed manually into the comparator storage switches SS231, SS232, and SS233 in the manner described in setting up the initial reading operation.

In the event that the comparator number which was being read at the time of parity failure is the same as the preceding comparator number, the tape-reading unit should continue to read the remainder of the information contained on the frame being sensed. The operator may cause this to be accomplished by depression of the manual-read push button 250 on the control panel 80 (FIG. 2), thus closing the contacts SP275A1 (FIG. 22B), which completes a circuit extending from the positive conductor 300 over the contacts SP275A1 and the relay K281 to the negative conductor 301 to energize said relay K281. Energization of the relay K281 causes the contacts K281A11 (FIG. 22A) to close, thus bypassing the parity failure contacts K271A13 in the energizing circuit for the trip coil L201 (FIG. 22A). This permits the reading unit 33 to advance through the remainder of the comparator numbers encoded on the tape. However, these comparator numbers are not entered into the storage switches SS231, SS232, and SS233, due to the fact that the parity failure relay K271 (FIG. 22A) has deenergized and therefore opened the contacts K271AC11 (FIG. 13) to interrupt the energizing circuits for the coils of the switches SS231, SS232, and SS233.

When the comparator number characters on the tape have been advanced past the reading station of the reading unit 33, the stepping switch SS201 (FIG. 14) is in position 4, so that the next character sensed from the tape will be used to energize a solenoid 289 for depressing a key in the control row 2 of the accounting machine 31. At this time, the contacts SC213 (FIG. 14) close, to apply power from the positive terminal 321 over said contacts SC213, level "K" of the stepping switch SS201, a terminal 369 (FIGS. 14 and 22A) and the relay K271 to the negative conductor 301, to energize the relay K271. Closing of the contacts SC213 occurs at 25 degrees of rotation of the reader cam line, which allows the relay K271 to energize and close the contacts K271A3 (FIG. 14) in the common of the energizing circuit for the key bank solenoids in time to allow the energization of the selected one of the transaction bank solenoids 289 during the remainder of the cycle of the reader cam line. The remainder of the operation is then continued in a normal manner.

In the event that the comparator number being read at the time of parity failure was different from the preceding number, a new balance operation of the accounting machine should be made. This is effected manually by depression of the manual new balance push button 249, thereby closing the contacts SP274A1 (FIG. 22A). The contacts SP274A1 by-pass the parity failure contacts K271A13 (FIG. 22A) in the energizing circuit for the reader trip coils L201. The by-pass circuit for energizing the coils L201 extends from the positive conductor 300 over the contacts SC20A1, SC945, ST250B2, SP274A1, K272B2, K280B2, K251B11, K283B1, K250B11, SC212, SC250, SC209, and the coils L201, to the negative conductor 301. Cycling of the cam line to bring it to the final-order comparator position is effected through the above circuit.

The normally-closed relay contacts K272B2 are controlled by the relay K272 (FIG. 22B). This relay is energized under the control of the contacts K243AC12, which are in turn controlled by the relay K243 (FIG. 22A), which energizes when the final or final-order comparator number is read, in the manner previously described. The energizing circuit for the relay K272 extends from the positive conductor 300 over the relay contacts K243AC12, the resistor 370, and the relay K272 to the negative conductor 301. It will be seen that energization of the relay K272 takes place at a time when the reading cycle for the final order of the comparator number is in progress, so that the next cycle of the reader cam line will take place during the reading of an amount or transaction character to be posted on an account card which follows the one currently in the accounting machine. Energization of the relay K272 opens the contacts K272B2 (FIG. 22A) to prevent the reader trip coils L201 from initiating another operation of the reader cam line. Energization of the relay K272 also closes the relay contacts K272A1 (FIG. 22B) to complete a holding circuit for the relay K272, which extends from the positive conductor 300 over the contacts SC943, the contacts K272A1, the resistor 370, and the relay K272 to the negative conductor 301.

At the same time, the energization of the relay K272 causes the contacts K272A3 (FIG. 22B) to close to complete an energizing circuit for the new balance trip relay K250. This circuit was prepared by the previous depression of the manual new balance button 249 on the control panel 80, which caused the contacts SP274A2 to close. The energizing circuit for the relay K250 extends from the positive conductor 300 over the contacts SP274A2, the contacts K272A3, and the relay K250 to the negative conductor 301, to energize said relay. This closes the contacts K250A13 (FIG. 19) in an operating circuit of the accounting machine 31. A standard new balance cycle of the accounting machine is initiated through closing of the contacts K250A13.

The account card on which the new balance operation takes place in the accounting machine is subsequently ejected from the accounting machine, and the feeder 32 then feeds cards to the accounting machine until a correct account number comparison is again made over the circuit of FIG. 12 in the manner previously described, at which time another balance pickup cycle of the accounting machine is initiated. However, in order to begin reading the amount on this next account card, the parity failure relay K271 (FIG. 22A) must first be manually reenergized by depression of the start-reader button 226 on the control panel 80, which closes the contacts SP280A1 (FIG. 22A) to energize the relay K271 over a circuit which extends from the positive conductor 300 over the contacts SP280A1 and the relay K271 to the negative conductor 301.

This completes the description of the parity failure circuitry.

Means are provided to lock the tape reader unit 33 against further operation in the event of a faulty pickup of information from the ledger card by the accounting machine 31. At any time that a faulty pickup of information by the accounting machine from a ledger card occurs, a relay in the accounting machine is operated to close the contacts K308B3 (FIG. 22A), thereby completing a circuit which extends from the positive conductor 300 over the contacts K308B3 and a relay K285 to the negative conductor 301.

Energization of the relay K285 closes the contacts K285A11 (FIG. 18), which completes a circuit through a pilot light I202, turning on said light to illuminate the indicator 238 on the panel 80, thus indicating a "gate check" condition.

Energization of the relay K285 also opens the contacts K285B1 (FIG. 19) in the row 2 control circuitry of the accounting machine 31, to disable row 2 operation of the accounting machine.

Energization of the relay K285 also causes the contacts K285A2 (FIG. 22B) to close, completing a circuit which extends from the positive conductor 300 over the contacts K285A2 and the relay K280 to the negative conductor 301, and energizing said relay K280. This relay is known as the reader stop relay, and a primary function of it is to open the contacts K280B2 (FIG. 22A), which prevent the reader trip coils L201 from operating until the contacts K280B2 are once more closed. Energization of the relay K280 also causes the contacts K280A1 (FIG. 22B) to close, thereby completing a holding circuit to maintain the relay K280 energized, said holding circuit extending from the positive conductor 300 over the contacts SP280B2, SP261B2, K280A1, K262B12, and the relay K280 to the negative conductor 301.

When a faulty pickup of information from a ledger card, also known as a "gate check," takes place, the reader stop relay K280 remains energized after the "gate check" condition has been removed. In order to commence operation of the reader unit 33 once more, the operator depresses the start-reader push button 226 on the panel 80, thereby opening the contacts SP280B2 in the holding circuit for the relay K280 and deenergizing said relay.

The ledger cards used in the system embodying the present invention have a limited capacity; that is, there are a certain number of lines or spaces available on each card for the entry of printed information, and when these spaces have been filled, a new card is required. Accordingly, it is essential that if a ledger card becomes filled by entry of printed information during a posting operation, the system must be halted, so that the old ledger card may be replaced with a new ledger card by the operator.

Information that the capacity of a ledger card has been reached is produced by closing of the contacts K306A4 (FIG. 22B) of the accounting machine under control of mechanism located therein which is responsive to the condition of the table holding the ledger card. Closing of the contacts K306A4 completes a circuit which extends from the positive conductor 300 over the contacts K306A4 and the relay K280 to the negative conductor 301 to energize said relay, which then performs the same function as described above for a "gate check" condition. Contacts K306A3 (FIG. 18) are operated by the same mechanism which operates the contacts K306A4, and closing of the contacts K306A3 completes a circuit to a pilot light I201 (FIG. 18), which is thereby turned on to illuminate the indicator 237 on the panel 80 (FIG. 2) to inform the operator of the filled card condition.

The overdraft control circuitry utilized in the present system will now be described. Six different types or variations of overdraft control are possible in the present system and may be achieved by using combinations of the key-operated switches 222, 223, and 224 on the control panel 80 of the reader unit 33.

In the first overdraft condition to be described, the feeder 32 is effective to sort out any account card in which there is an overdraft balance. To set the system for this condition, the switches 222, 223, and 224 are set so that the contacts ST260B1 (FIG. 22A) are open, the contacts ST260A2 (FIG. 22A) are closed, the contacts ST261A1 (FIG. 22B) are open, the contacts ST262A1 (FIG. 19) are closed, and the contacts ST262A2 (FIG. 22B) are closed. A set of contacts SC30 (FIG. 22A), located in the accounting machine, are closed by mechanism in the accounting machine which operates whenever an overdraft condition takes place. Closing of the contacts SC30 during an overdraft condition in the accounting machine completes a circuit which extends from the positive conductor 300 over the contacts ST260A2, the contacts SC30, the normally closed contacts K263B2, and an overdraft relay K260, to the negative conductor 301, for energization of said relay. A resistor 371 and a capacitor 372 are serially connected in parallel combination to the relay K260 for time delay purposes, as will be described subsequently.

Energization of the relay K260 causes the contacts K260B11 (FIG. 19) to open, but this has no effect on the operating circuitry, since the contacts ST262A1 have been closed under control of the switch 224 on the control panel 80 in this particular overdraft condition.

Energization of the relay K260 also causes the contacts K260A13 (FIG. 19) to close. The contacts K260A13 are in the operating circuitry for the card feeder 32, and their closure causes the card feeder to sort the account card on which an overdraft has taken place into a separate bin of the feeder 32 following the new balance operation on the account card.

In addition, energization of the relay K260 causes the contacts K260A12 (FIG. 19) to close, completing a circuit for turning on a pilot light I204 to illuminate the indicator 236, to give visual indication on the panel 80 of an overdraft condition.

Energization of the relay K260 also causes the contacts K260A1 (FIG. 22A) in a holding circuit for the relay K260 to close, but this holding circuit is ineffective to maintain the relay K260 in energized condition, due to the fact that the contacts ST260B1, also in the holding circuit, have been placed in an open condition by the setting of the switch 222 on the control panel 80.

The contacts SC30 (FIG. 22A) retain the information that an overdraft condition has occurred in the accounting machine until the next correct pickup from a subsequent account card is made by the accounting machine. Since "inactive" cards may be fed to the accounting machine and ejected before the next correct pickup operation from an account card is made by the accounting machine, it is required that the overdraft sort information be cancelled immediately, so that any following "inactive" cards are not sorted into the separate or "overdraft" bin of the feeder, in addition to the card upon which an overdraft balance has existed. In order to accomplish this, the relay K260, which controls the contacts K260A13 (FIG. 19), which operate the bin control in the feeder, must be deenergized.

A relay K263 (FIG. 22B) is used to accomplish this, through its control of the contacts K263B2 (FIG. 22A) in the energizing circuit for the relay K260. It will be seen that energization of the relay K263 will open the contacts K263B2 and thereby deenergize the relay K260, opening the contacts K260A13 (FIG. 19) in the feeder circuit, and thereby removing the overdraft sort condition from the feeder. Energization of the relay K263 takes place in response to closing of contacts K103A3 (FIG. 22B), which are operated in response to the energization of a relay in the feeder 32. Closing of the contacts K103A3 completes a circuit from the positive conductor 300 over the contacts K103A3 and the relay K263 to the negative conductor 301, to energize the relay K263.

Since the relay controlling the contacts K103A3 operates at the beginning of each pickup cycle of the accounting machine, the relay K263 will similarly operate at the beginning of each pickup cycle and will be maintained over a holding circuit which extends from the positive conductor 300 over the contacts SC943 (FIG. 22B), the contacts K263A1, which are closed by energization of the relay K263, and the relay K263 to the negative conductor 301. The relay K263 will be maintained in energized condition over this holding circuit until a correct pickup of information from an account card by the accounting machine is made, at which time the contacts SC943 will open to interrupt the circuit and deenergize the relay K263.

Energization of the relay K263 at the beginning of each pickup cycle causes the contacts K263B2 (FIG. 22A) to open as the account card following the account card on which an overdraft is recorded enters the accounting machine. By this time, the card having the overdraft information, which it is desired to sort into the separate bin, has been ejected from the accounting machine and is part of the way into its location in the separate bin. The previously-mentioned time delay circuit on the relay K260, comprising the resistor 371 and the capacitor 372, maintains the relay K260 in energized condition long enough for the card bearing the overdraft balance to reach the separate bin even though the relay K260 is deenergized through opening of the relay contacts K263B2.

The second overdraft condition which may be set into the system by proper combination of the switches 222, 223, and 224 on the control panel 80 of the reading unit 33 is similar to the first condition, previously described, except that in this second condition, any balance which at one tme during posting has gone into an overdraft condition and subsequently has returned to a positive balance will be sorted into a separate bin, as well as any balance which is an overdraft balance at the conclusion of posting. For this type of operation, the switches 222, 223, and 224 are set so that the contacts ST260B1 (FIG. 22A) are closed, the contacts ST260A2 (FIG. 22A) are opened, the contacts ST261A1 (FIG. 22B) are opened, the contacts ST262A1 (FIG. 19) are closed, and the contacts ST262A2 (FIG. 22B) are closed.

When an overdraft balance occurs with the switches 222, 223, and 224 (FIG. 2) set as described above, initial energization of the relay K260 takes place over a circuit which extends from the positive conductor 300 over the contacts SC934 (FIG. 22A), which are controlled by the accounting machine and are closed from 320 degrees to 350 degrees of accounting machine operation, the overdraft contacts SC30, which close at 300 degrees of accounting machine operation when an overdraft exists, the contacts K263B2, and the relay K260 to the negative conductor 301. The contacts SC934, by not closing to complete the above circuit until 320 degrees of accounting machine operation, insure that the circuit is not completed until the overdraft control contacts SC30 have been set according to the condition of the accounting machine in the current cycle of operation, since the overdraft contacts SC30, when operated to indicate an overdraft condition, remain in operated position until 300 degrees of the next cycle of accounting machine operation. When the relay K260 energizes, the contacts K260A1 close, to complete a holding circuit for the relay K260 which extends from the positive conductor 300 over the contacts K263B11, K260A1, ST260B1, and the relay K260 to the negative conductor 301.

Due to the above holding circuit, even though the accounting machine may go from an overdraft condition to a positive balance condition prior to a new balance operation, due to posting of sufficient deposit amounts to overcome the overdraft balance, the relay K260 will remain energized. This maintains the contacts K260A13 (FIG. 19) in closed condition at the conclusion of the new balance operation of the accounting machine, causing the account card on which the overdraft took place to be sorted by the feeder into the separate bin in the same manner as previously mentioned for the first type of overdraft control condition. In this case, the initiation of the next pickup by the accounting machine operates the relay in the feeder which controls the contacts K103A3 (FIG. 22B) to energize the relay K263 in the manner previously described. This causes the contacts K263B11 (FIG. 22A) in the holding circuit for the relay K260 to be opened, thereby interrupting said circuit and deenergizing the relay K260.

In the third type of overdraft condition to be described, the system is set by the switches 222, 223, and 224 on the control panel 80 (FIG. 2) so that the reading unit 33 will lock whenever the accounting machine attempts to take a new balance on an account which is in overdraft condition. The accounting machine also will lock and will not make this new balance so long as the overdraft condition exists. With these switches properly set for this condition, the contacts ST260B1 (FIG. 22A) are open, the contacts ST260A2 (FIG. 22A) are closed, the contacts ST261A1 (FIG. 22B) are closed, the contacts ST262A1 (FIG. 19) are open, and the contacts ST262A2 (FIG. 22B) are open.

Opening of the contacts ST260B1 (FIG. 22A) disables the holding circuit for the overdraft relay K260. Closing of the contacts ST261A1 prepares an energizing circuit for the relay K280 (FIG. 22B). When the relay K250, the new balance relay, is energized to attempt a new balance in the manner previously described, the contacts K250A12 (FIG. 22B) are closed, thus completing a circuit which extends from the positive conductor 300 over the contacts K250A12, K261B2, K260A2, ST261A1, K262B12, and the relay K280 to the negative conductor 301, to energize the relay K280. Energization of the relay K280 opens the contacts K280B2 (FIG. 22A) to disable the energizing circuit for the reader trip coils L201 until such time as the relay K280 is deenergized.

Normally, when the relay K250 energizes, closing of the contacts K250A13 (FIG. 19) causes the accounting machine to make a new balance operation. In this case, however, the contacts ST262A1 have been opened under control of the switch 224, and the contacts K260B11 are open when an overdraft condition occurs, due to energization of the relay K260. The circuit containing these contacts is therefore not completed when an overdraft condition exists, and the accounting machine is not permitted to make a new balance operation. It is therefore seen that at this point the tape-reading unit 33 is locked against further operation and the accounting machine 31 is locked against further operation. The operator must therefore act to remove this overdraft condition.

The operator may, if desired, make manual corrective entries on the accounting machine keyboard to remove the items causing the overdraft. Alternatively, the operator may make a manual new balance operation on the accounting machine, which causes the feeder 32 to operate, sorting the overdraft card into the separate bin and feeding cards to the accounting machine until the next "active" account card enters the machine to release the overdraft condition, deenergizing the relay K260. The balance on this "active" card is picked up by the accounting machine and entered therein. The operator then depresses the push button 226 on the control panel 80 (FIG. 2), which opens the contacts SP280B2 (FIG. 22B) to interrupt the holding circuit for the reader stop relay K280 and deenergize said relay. The next reading operation may then be commenced in the conventional manner.

The fourth type of overdraft control condition to which the present system may be set is similar to the third type described above, except that in the fourth type, the overdraft switch SC30 is employed in such manner that the accounting machine will be locked when a new balance operation is attempted if an overdraft condition has existed at any time during the posting of the account, even though there may not be an overdraft balance at the time a new balance operation is made. In order to accomplish this result, the switches 222, 223, and 224 on the control panel 80 (FIG. 2) are set so that the contacts ST260B1 (FIG. 22A) are closed, the contacts ST260A2 (FIG. 22A) are open, the contacts ST261A1 (FIG. 22B) are closed, the contacts ST262A1 (FIG. 19) are open, and the contacts ST262A2 (FIG. 22B) are open.

It will be seen that with the contacts ST260B1 (FIG. 22A) closed, energization of the relay K260 at any time by closing of the contacts SC30 will cause the holding circuit which extends from the positive conductor 300 over the contacts K263B11, the contacts K260A1, the contacts ST260B1, and the relay K260 to the negative conductor 301, to be completed by closing of the relay contacts K260A1 under control of the relay K260 when said relay is energized. With this holding circuit completed to maintain the relay K260 in energized condition, even though the contacts SC30 may reopen before a new balance operation is made, the relay K260 will remain energized to lock the accounting machine when a new balance operation is attempted.

It will also be noted that the circuitry for energizing, and maintaining energized, the relay K280, which affects the operation of the reader, is the same in this instance as that which was described in connection with the third type of overdraft condition, set forth above.

Two additional types of overdraft setting are available to cause the reading unit 33 to lock immediately upon receiving an overdraft indication from the accounting machine. These are described below.

In the fifth type of overdraft condition to which the present system may be set, the reading unit 33 locks immediately, and accounts in which there is an overdraft new balance are sorted into a separate bin of the feeder 32. In order to accomplish this, the switches 222, 223, and 224 of the control panel 80 (FIG. 2) are set so that the contacts ST260B1 (FIG. 22A) are open, the contacts ST260A2 (FIG. 22A) are closed, the contacts ST261A1 (FIG. 22B) are closed, the contacts ST262A1 (FIG. 19) are closed, and the contacts ST262A2 (FIG. 22B) are closed.

When an overdraft condition occurs in this case, the relay K260 is energized in the manner previously described over a circuit which extends from the positive conductor 300 through the contacts ST260A2, the contacts SC30, the contacts K263B2, and the relay K260 to the negative conductor 301. Energization of the relay K260 closes the contacts K260A2 (FIG. 22B), which completes an energizing circuit extending from the positive conductor 300 over the contacts ST262A2 (FIG. 22B), K261B2, K260A2, ST261A1, K262B12, and the relay K280, to the negative conductor 301, to energize the relay K280. This opens the contacts K280B2 (FIG. 22A) to disable the energizing circuit for the reader trip coils L201, in the manner previously described, to prevent further operation of the reader.

At this time, a number of possible courses are available to the operator to release the overdraft condition. First, in the event that there are no more items following on the account being posted which would cause further overdraft conditions, the operator may return the item causing the overdraft, by operating the switch 221 on the control panel 80. This opens the contacts ST250A2 (FIG. 22A) to disable the coils L201, and also operates the contacts ST250C1 (FIG. 19) to complete a circuit in the accounting machine to permit manual operation thereof, while preventing automatic operation of said machine. The operator may then make an appropriate manual posting on the accounting machine. This returns the overdraft mechanism of the accounting machine to a positive condition, and opens the contacts SC30. Opening the contacts SC30 interrupts the energizing circuit for the relay K260 and causes said relay to deenergize, thereby opening the contacts K260A2. The relay K280 is now held in energized condition over the holding circuit which extends from the positive conductor 300 through the contacts SP280B2, SP261B2, K280A1, K262B12, and the relay K280, to the negative conductor 301. The relay K280 may be deenergized by depression of the start-reader button 226 on the control panel 80 (FIG. 2), which opens the contacts SP280B2 (FIG. 22B) and causes deenergization of the relay K280 by interrupting its holding circuit. The reading unit 33 is then free to continue reading the remainder of the items on the account being posted.

Alternatively, if it is desired by the operator to let the items which cause the overdraft condition remain on the account being posted, the posting may be continued, even though the overdraft condition exists, by depression of the resume-read button 230 on the control panel 80 (FIG. 2), which closes the contact SP261A1 (FIG. 22A) and opens the contacts SP261B2 (FIG. 22B). Closing of the contacts SP261A1 energizes the relay K261 over a circuit which extends from the positive conductor 300 through the contacts SP261A1 and the relay K261 to the negative conductor 301. Energization of the relay K261 closes the contact K261A1 (FIG. 22A) to complete a holding circuit for the relay K261 which extends from the positive conductor 300 over the contacts K263B11, K261A1, and the relay K261 to the negative conductor 301. Energization of the relay K261 also causes the contacts K261B2 (FIG. 22B) in the energizing circuit for the relay K280 to open. Opening of these contacts interrupts one branch of the energizing circuit for the relay K280, and opening of the contacts SP261B2 under control of the button 230, as previously mentioned, opens the other branch of the energizing circuit for the relay K280. This relay is thus deenergized, which permits the reader to continue reading information for posting to the account even though the overdraft condition exists on the account. When a new balance operation is taken at the conclusion of posting to the account, in the event that the accounting machine is still in overdraft condition, the card being posted will be sorted into a separate bin.

A third possible operation by the operator in the event that the reader is locked against operation due to the overdraft condition existing in the accounting machine is to skip reading of items pertaining to this account, take a new balance on the new account, and cause the feeder to feed the next account card for commencement of posting to the next account. This routine may be followed when it is desired to by-pass the remainder of the items on any given account. Such an operation is initiated by depression of the skip-tape push button 229 on the control panel 80 (FIG. 2), which causes the contact SP260A1 (FIG. 22A) to close. This completes a circuit which extends from the positive conductor 300 over the contacts SP260A1 and a skip-tape relay K262 to the negative conductor 301, thereby energizing the relay K262. This causes the contacts K262A3 (FIG. 22A) to close, thus completing a holding circuit which extends from the positive conductor 300 over the contacts SC20A1, the contacts K262A3, and the relay K262, to the negative conductor 301, to maintain the relay K262 in energized condition.

Energization of the relay K262 also opens the contacts K262B1 (FIG. 14), which interrupts the common return line for the key bank solenoids to prevent any keys of the accounting machine keyboard from being energized during a skip-tape operation.

The contacts K262B2 (FIG. 19) are also opened to prevent accounting machine operation during a skip-tape operation.

Energization of the relay K262 also causes opening of the contacts K262B11 (FIG. 22B), which places the holding circuit for the trip relay K251 under control of the contacts SS201B2, which are opened only when the stepping switch SS201 returns to its home position. It will be seen that the relay K251 will accordingly be maintained in energized condition until the stepping switch SS201 returns to home.

Energization of the relay K262 also causes the contacts K262B12 (FIG. 22B) to open, thereby interrupting the holding circuit for maintaining the relay K280 in energized condition. Deenergization of the relay K280 permits the reader trip coils L201 (FIG. 22A) to operate even though the overdraft condition still exists. The skip-tape operation can therefore be performed either after returning all items by corrective entries into the accounting machine to return the account being posted back into a positive balance, or said operation can be performed while the account is still in overdraft.

The final type of overdraft condition to which the present system may be set is similar to the above except that a "memory circuit" for the relay K260 is utilized, which allows the system to sort a card pertaining to an account which has been in overdraft condition into a separate bin of the feeder 32 even though the overdraft condition has been removed. In order to accomplish this, the switches 222, 223, and 224 on the control panel 80 (FIG. 2) are set so that the contacts ST260B1 (FIG. 22A) are closed, the contacts ST260A2 (FIG. 22A) are open, the contacts ST261A1 (FIG. 22B) are closed, the contacts ST262A2 (FIG. 22B) are closed, and the contacts ST262A1 (FIG. 19) are closed.

The operating circuitry functions in this overdraft condition in the same manner as that described in the immediately preceding condition, except for the fact that the holding circuit for the relay K260 which extends through the contacts ST260B1 (FIG. 22A) is effective to maintain the relay K260 in energized condition once it has been energized by closure of the contacts SC30, which indicate an overdraft condition, even though these contacts have subsequently reopened due to the account returning to a positive balance. The card pertaining to this account is then sorted into a separate bin. The remainder of the circuitry which is utilized when this overdraft condition has been set into the system is the same as previously described.

Means will now be described which are effective to cause the tape-reading unit 33 to lock up under manual control by the operator. It will be recalled that in the description of the operating circuitry for the present system, a number of interlock conditions have been described which cause the reading unit 33 to lock up in the event of certain misoperations or malfunctions. However, it may be desired to permit the operator to terminate operation of the reading unit 33 in case of some misoperation not covered by the interlocks contained in the circuitry. This can be accomplished by depression of the stop-reader button 227 on the control panel 80 (FIG. 2), which controls the contacts SP281A1 (FIG. 22B). Depression of the push button 227 closes the contacts SP281A1, which completes an energizing circuit extending from the positive conductor 300 over the contacts SP281A1 and the reader stop relay K280 to the negative conductor 301, to cause energization of the relay K280 and thereby lock up the reading unit 33 against further operation by opening the contacts K280B2 in the operating circuit for the reader trip coils L201 (FIG. 22A). Once the relay K280 has energized, its holding circuit over the contacts K280A1 is completed, so that the push button 227 may be released without the reader once again commencing operation. This misoperation of the reading unit 33 may be then investigated and reading initiated once more, when the cause of misoperation has been removed.

In summary, it will be seen that a typical operation of the present system, in which an account card is fed from the feeder 32 to the accounting machine 31, checked for proper correspondence to the frame of information being read from the tape by the reader 33, and then posted upon in accordance with the information contained on the tape, has been described, in terms of the circuitry involved for performing the various functions incident to completion of this operation. While other operations or variations thereof are possible and may be accommodated by the present system, it is felt that the present description constitutes a full, clear, and complete explanation of the mode of operation of the present system.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a device of the class described, capable of sensing information from record media, performing computations with the information sensed, and recording the result of the computations, the combination comprising computing means capable of performing arithmetic computations; operating means controlled by the condition of the computing means; sensing means for sensing information from the record media; sequence means for operating the sensing means; control means to initiate operation of the sequence means under control of the operating means; decoding means to translate signals generated by the sensing means, as the media is sensed, to a form usable by the computing means; a plurality of input means for effecting input of the sensed information into the computing means; sequentially operable routing means for sequentially routing the signals from the decoding means to the various input means according to a predetermined program; and interlock means to prevent operation of the input means in response to the signals generated by the sensing means in the event of improper functioning of the sensing means.

2. In a device of the class described, capable of sensing information from record media, performing computations with the information sensed, and recording the result of the computations, the combination comprising computing means capable of performing arithmetic computations; operating means controlled by the condition of the computing means; sensing means for sensing information from the record media; sequence means for operating the sensing means; control means to initiate operation of the sequence means under control of the operating means; decoding means to translate signals generated by the sensing means, as the media is sensed, to a form usable by the computing means; a plurality of solenoid-operated input means for effecting input of the sensed information into the computing means; and sequentially operable routing means for sequentially routing the signals from the decoding means to the solenoids of the various input means according to a predetermined program, to energize said solenoids, thereby operating the input means according to the information on the record media.

3. In a device of the class described, capable of sensing information from record media, performing computations with the information sensed, and recording the result of the computations, the combination comprising computing means capable of performing arithmetic computations; operating means controlled by the condition of the computing means; sensing means for sensing information from a record medium; sequence means for operating the sensing means; control means to initiate operation of the sequence means under control of the operating means; decoding means to translate signals generated by the sensing means, as the medium is sensed, to a form usable by the computing means; a plurality of input means for effecting input of the sensed information into the computing means; and sequentially operable routing means for sequentially routing the signals from the decoding means to the various input means according to a predetermined program.

4. In a device of the class described, capable of sensing information from two different types of media, performing computations with the information sensed, and recording the result of the computations on one of the two types of media, the combination comprising computing means capable of sensing information from a first type of medium and performing arithmetic computations using said information, including total-taking operations; reading means for sensing data from a second type of medium; means controlled by the reading means for entering data from the second type of medium into the computing means; overdraft means for determining whether the total of data computed by the computing means is positive or negative in sign; first overdraft-responsive means capable of preventing further operation of the reading means in response to a negative total; second overdraft-responsive means capable of preventing further total-taking operation of the computing means in response to a negative total; overdraft selector means for selectively rendering either the first overdraft-responsive means or the second overdraft-responsive means effective to function in the event of a negative total; sorting means for sorting a record member of the first type into one of a plurality of receptacles upon completion of its use by the computing means; and means controlled by the overdraft selector means to operate the sorting means to cause a record member of said first type to be sorted into a selected receptacle in the event that a negative total is associated therewith.

5. In a device of the class described, capable of sensing information from two different types of media, performing computations with the information sensed, and recording the result of the computations on one of the two types of media, the combination comprising computing means capable of sensing information from a first type of medium, and performing arithmetic computations using said information; reading means for sensing data from a second type of medium; means controlled by the reading means for entering data from the second type of medium into the computing means; overdraft means for determining whether the total of data computed by the computing means is positive or negative in sign; first overdraft-responsive means capable of preventing further operation of the reading means in response to a negative total; second overdraft-responsive means capable of preventing further total-taking operation of the computing means in response to a negative balance; and overdraft selector means for selectively rendering either the first overdraft-responsive means or the second overdraft-responsive means effective in the event of a negative balance.

6. In a device of the class described, capable of sensing information from two different types of record members, performing computations with the information sensed, and recording the result of the computations on one of the two types of record members, the combination comprising computing means capable of sensing information from a first type of record member, performing arithmetic computations using said information, and ejecting the first type of record member upon completion of its use; sorting means associated with the computing means for sorting the ejected record member into one of a plurality of receptacles; reading means for sensing data from a second type of record member; means controlled by the reading means for entering data from the second type of record member into the computing means; overdraft means associated with the computing means for determining whether the total of data entered into the computing means is positive or negative in sign; and sorting control means responsive to the condition of the overdraft means and capable of controlling the sorting means to cause record members of the first type to be sorted into receptacles according to the sign of the total computed in connection with the data on said record members.

7. In a device of the class described, capable of sensing information from two different types of media, performing computations with the information sensed, and recording the result of the computations on one of the two types of media, the combination comprising computing means capable of sensing information from a first type of medium, and performing arithmteic computations using said information; sensing means for sensing data from a second type of medium; means controlled by the sensing means for entering data from the second type of medium into the computing means; overdraft means associated with the computing means for determining whether the total of data entered into the computing means in a given operation is positive or negative in sign; means responsive to the condition of the overdraft means to prevent further operation of the reading means in the event of a negative total; and means operable to advance the second type of medium without its being sensed in order to bring the device into condition for further operation.

8. In a device of the class described, capable of sensing information from two different types of media, performing computations with the information sensed, and recording the result of the computations on one of the two types of media, the combination comprising computing means capable of sensing information from a first type of medium, and performing arithmetic computations using said information; reading means for sensing the data on a second type of medium and entering said data into the computing means; controlled by the reading means for entering data from the second type of medium into the computing means; overdraft means associated with the computing means and capable of determining whether the sign of a total computed by said computing means is positive or negative; and means controlled by the condition of the overdraft means for preventing further operations of the computing means in the event of a negative total.

9. In a device of the class described, capable of sensing information from two different types of media, performing computations with the information sensed, and recording the result of the computations on one of the two types of media, the combination comprising computing means capable of sensing information from a first type of medium, and performing arithmetic computations using said information; reading means for sensing data from a second type of medium; means controlled by the reading means for entering data from the second type of medium into the computing means; overdraft means associated with the computing device for determining whether the total of data entered into the computing means in a given operation is positive or negative in sign; and means responsive to the condition of the overdraft means to prevent further operation of the reading means in the event of a negative total.

10. In a device of the class described, capable of sensing information from two different types of media, and performing computations with the information sensed, the combination comprising computing means capable of sensing information from a first type of medium, and performing arithmetic computations using said information; first data comparison switching means associated with the computing means, having a number of contact positions corresponding to the number of digits of the radix employed for data comparison and having means settable to various contact positions according to the value of comparison data sensed from the first type of medium; sensing means for sensing data from a second type of medium; decoding means for generating signals in accordance with the data sensed by the sensing means; second data comparison switching means, said second data comparison switching means having a number of contact positions corresponding to the number of digits of the radix employed for data comparison and having means settable to various contact positions for storing comparison data sensed from the second type of medium; stepping means controlled by the decoding means and operable to set the second data comparison switching means according to comparison data sensed from the second type of medium; a data comparison circuit serially connecting the first and second switching means; and means associated with the data comparison circuit and effective to cause the computing means to reject media of the first type when the first and second data comparison switching means are not correspondingly set.

11. In a device of the class described, capable of sensing information from two different types of media, and performing computations with the information sensed, the combination comprising computing means capable of sensing information from a first type of medium, and performing arithmetic computations using said information; first data comparison switching means associated with the computing means, having a number of contact positions corresponding to the number of digits of the radix employed for data comparison and having means settable to various contact positions according to the value of comparison data sensed from the first type of medium; sensing means for sensing data from a second type of medium; second data comparison switching means controlled by the sensing means, having a number of contact positions corresponding to the number of digits of the radix employed for data comparison and having means settable to various contact positions for storing comparison data sensed from the second type of medium; a data comparison circuit serially connecting the first and second data comparison switching means; and means associated with the data comparison circuit and effective to cause the computing means to reject media of the first type when the first and second data comparison switching means are not correspondingly set.

12. In a device of the class described, capable of sensing information from two different types of media, and utilizing the data sensed, the combination comprising sensing means for sensing comparison information from a first type of medium; first storage means for storing said information; second storage means for storing information sensed from a second type of medium; comparator means for comparing the information sensed from the two types of media and stored in their respective storage means; and manual input means for manually effecting storage of a comparator number in the second storage means, said manual input means including digit value switching means and digit order switching means, the same digit value switching means being used in combination with various digit order switching means to establish a multiple-order comparator number.

13. In a device of the class described, capable of sensing information from media, and performing computations, including taking of balances, with the information sensed, the combination comprising computing means capable of performing arithmetic computations; sensing means for sensing code information and amount information associated therewith from the media; code storage means for storing code information read from the media, said code storage means having a number of contact positions corresponding to the number of digits of the radix used in the code, and also having means settable to various contact positions to represent the value of the code information sensed from the media; a decoding network to translate signals from the form in which they are generated by the sensing means, as the media are sensed, to the radix system employed in the code storage means and the computing means; code information control means for effecting application of the code information signals to the code storage means; amount information control means for effecting application of the amount information signals to the computing means; means for comparing the code information sent to the code storage means with that in the code storage means; and means to cause the computing means to take a new balance when the code information transmitted to the code storage means does not agree with that stored therein.

14. In a device of the class described, capable of sensing information from media, and performing computations, including taking of balances, with the information sensed, the combination comprising computing means capable of performing arithmetic computations; reading means for sensing code information and amount information associated therewith from the media and generating signals in accordance with the information sensed; code storage means for storing code information sensed from the media, said code storage means having a number of contact positions corresponding to the number of digits of the radix used in the code, and also having means settable to various contact positions to represent the value of the code information sensed from the media; code information control means for effecting application of the code information signals to the code storage means; amount information control means for effecting application of the amount information signals to the computing means; means associated with the contact positions of the code storage means for comparing the code information sent to the code storage means with that in the code storage means; and means to cause the computing means to take a new balance when the code information transmitted to the code storage means does not agree with that stored therein.

15. In a device of the class described, capable of sensing information from two different types of media, and utilizing the information sensed, the combination comprising utilizing means capable of sensing information from a first type of medium and utilizing said information; sensing means for sensing data from a second type of medium; means for storing the data sensed by the sensing means; comparison means for comparing the data stored in the storage means to the data sensed from the first type of medium; first checking means for checking whether or not the data sensed from the second type of medium conforms to a predetermined code; second checking means responsive to proper entry of the sensed data into the storage means; control means for controlling operation of the sensing means; a checking circuit embodying the first and second checking means and operable to disable the control means if the first or second checking means indicate improper functioning; and time-delay means to maintain the control means in operating condition until the checking circuit has determined whether or not there has been improper functioning.

16. In a device of the class described, capable of sensing information from two different types of media, and utilizing the information sensed, the combination comprising utilizing means capable of sensing information from a first type of medium and utilizing said information; sensing means for sensing data from a second type of medium; means for storing the data sensed by the sensing means; comparison means for comparing the data stored in the storage means to the data sensed from the first type of medium; first checking means for checking whether or not the data sensed from the second type of medium conforms to a predetermined code; second checking means responsive to proper entry of the sensed data into the storage means; control means for controlling operation of the sensing means; and a checking circuit embodying the first and second checking means and operable to disable the control means if the first or second checking means indicate improper functioning.

17. In a device of the class described, capable of sensing information from two different types of media, and utilizing the information sensed, the combination comprising utilizing means capable of sensing information from a first type of medium and utilizing said information; sensing means for sensing data from a second type of medium; means for storing the data sensed by the sensing means; comparison means for comparing the data stored in the storage means to the data sensed from the first type of medium; checking means for checking whether or not the data sensed from the second type of medium conforms to a predetermined code; control means for controlling operation of the sensing means; and a checking circuit responsive to the checking means and operable to disable the control means if the checking means indicate improper functioning.

18. In a device of the class described, capable of sensing information from two different types of record members, and performing computations with the information sensed, the combination comprising computing means capable of sensing information from a first type of record member, and performing arithmetic computations using said information; sensing means for sensing data from a second type of record member; storage means controlled by the sensing means for storing certain data from the second type of record member; comparison means to relate certain data from the first type of record member to the stored data from the second type of record member; means effective to cause the computing device to reject record members of the first type if the data on said first type of record member does not correspond to the related data on the second type of record member; counting means for counting the number of record members of the first type rejected consecutively; manually settable means which may be set to determine the maximum number of record members of the first type to be rejected consecutively; and means controlled by the counting means and the manually settable means to terminate operation of the device in the event that more than the set maximum number of record members of the first type are rejected consecutively.

19. In a device of the class described, capable of sensing information from two different types of record members, and performing computations with the information sensed, the combination comprising computing means capable of sensing information from a first type of record member, and performing arithmetic computations using said information; reading means for sensing data from a second type of record member; storage means controlled by the reading means for storing certain data from the second type of record member; comparison means to relate certain data from the first type of record member to the stored data from the second type of record member; means effective to cause the computing means to reject record members of the first type if the data on said first type of record member does not correspond to the related type of data on the second type of record member; counting means for counting the number of record members of the first type rejected consecutively; and means to terminate operation of the device in the event that a certain number of record members of the first type are rejected consecutively.

20. In a device of the class described, capable of sensing information from two different types of media, performing computations with the information sensed, and recording the result of the computations on one of the two types of media, the combination comprising computing means capable of sensing information from a first type of medium, and performing arithmetic computations using said information; checking means for detecting a faulty sensing of information from said first type of medium by said computing means; relay means controlled by said checking means; sensing means for sensing data from a second type of medium; means controlled by the sensing means for entering data from the second type of medium into the computing device; and means responsive to the relay means for controlling the sensing means to prevent further operation of said sensing means in the event of an incorrect entry of data from the first type of medium into the computing means.

21. In a device of the class described, capable of sensing information from record media, performing computations using the information sensed, and recording the results of the computations, the combination comprising computing means capable of sensing magnetically-stored information from a first type of record member, performing arithmetic computations using said information and additional information, printing a record of the computations on said first type of record member, and magnetically storing new information on said first type of record member; sensing means for sensing data from a second type of record member; means for entering the data sensed from the second type of record member into the computing means to provide said additional information; feeding means for automatically feeding record members of the first type to the computing means in response to a signal therefrom; a plurality of receiving means for receiving record members of the first type from the computing means when the computing means has completed operations upon said record members of the first type; and means for selecting a given one of the receiving means to receive a given record member of the first type according to a signal from the computing means.

22. In a device of class described, capable of sensing information from two different types of media, and utilizing the information sensed, the combination comprising utilizing means capable of sensing information from a first type of medium and utilizing said information; sensing means for sensing data from a second type of medium; storage means for storing the data sensed by the sensing means; a decoding network to translate signals generated in accordance with the data sensed by the sensing means from the form in which they are sensed to a form usable by the storage means; comparison means for comparing the data stored in the storage means to the data sensed from the first type of medium, and effective to cause rejection of media of the first type by said utilizing means in the event of a failure of comparison; control means for controlling operation of the sensing means; and checking means for checking whether or not the data sensed by the sensing means, in the form in which it is sensed from the second type of medium, conforms to a predetermined code, said checking means being operable to cause the control means to terminate operation of the sensing means, if the data fails to so conform.

References Cited in the file of this patent

UNITED STATES PATENTS

| | | |
|---|---|---|
| 2,357,455 | Bryce | Sept. 5, 1944 |
| 2,442,970 | Carroll et al. | June 8, 1948 |
| 2,684,718 | Luhn | July 27, 1954 |
| 2,746,679 | Stratton et al. | May 22, 1956 |
| 2,902,215 | Lauschke | Sept. 1, 1959 |

UNITED STATES PATENT OFFICE

CERTIFICATE OF CORRECTION

Patent No. 3,102,950 September 3, 1963

William C. Arnold et al.

It is hereby certified that error appears in the above numbered patent requiring correction and that the said Letters Patent should read as corrected below.

Column 4, line 26, for "argeement" read -- agreement --; column 18, line 5, for "expaining" read -- explaining --; column 23, line 19, for "K213C11" read -- K212C11 --; column 31, line 26, for "prevoiusly" read -- previously --; column 42, line 3, for "contact" read -- contacts --; column 45, line 32, for "arithmteic" read -- arithmetic --; line 55, before "controlled" insert -- means --.

Signed and sealed this 31st day of March 1964.

:AL)

test:

NEST W. SWIDER EDWARD J. BRENNER testing Officer Commissioner of Patents